(12) United States Patent
Xue et al.

(10) Patent No.: US 11,792,636 B2
(45) Date of Patent: Oct. 17, 2023

(54) SINGLE FREQUENCY NETWORK-MANNER RELAYING OF SIDELINK SIGNALS

(71) Applicant: QUALCOMM incorporated, San Diego, CA (US)

(72) Inventors: YIsheng Xue, San Diego, CA (US); Xiaoxia Zhang, San Diego, CA (US); Jing Sun, San Diego, CA (US); Chih-Hao Liu, San Diego, CA (US); Piyush Gupta, Bridgewater, NJ (US); Sony Akkarakaran, Poway, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/505,480

(22) Filed: Oct. 19, 2021

(65) Prior Publication Data
US 2023/0118395 A1    Apr. 20, 2023

(51) Int. Cl.
*H04W 8/18* (2009.01)
*H04W 16/26* (2009.01)
*H04W 8/22* (2009.01)

(52) U.S. Cl.
CPC ............. *H04W 8/18* (2013.01); *H04W 8/22* (2013.01); *H04W 16/26* (2013.01)

(58) Field of Classification Search
CPC ................................. H04W 72/02; H04L 5/00
See application file for complete search history.

(56) References Cited

U.S. PATENT DOCUMENTS

| | | | |
|---|---|---|---|
| 2020/0228247 A1* | 7/2020 | Guo | ...................... H04L 1/0025 |
| 2020/0351024 A1* | 11/2020 | Baghel | .................. H04L 5/0055 |

* cited by examiner

*Primary Examiner* — Sulaiman Nooristany
(74) *Attorney, Agent, or Firm* — Holland & Hart / Qualcomm

(57) ABSTRACT

Methods, systems, and devices for wireless communications are described. In some systems, a user equipment (UE) may perform single frequency network (SFN) manner relaying in sidelink to support exchanging packets between UEs, for example, without maintaining beamforming alignment between the UEs. A first UE (e.g., a source UE or destination UE) may establish a pre-agreement with a second UE for the second UE to operate as an SFN-manner relay over sidelink for the first UE. The pre-agreement may be reached via a publish-and-subscription procedure, in which the second UE publishes an SFN-type relaying service and the first UE subscribes to the SFN-type relaying service. The second UE may receive sidelink signaling associated with the first UE (e.g., transmitted by or to the first UE) and may relay the sidelink signaling in a resource configured for SFN-type transmission based on the first UE being subscribed to the SFN-type relaying service.

30 Claims, 11 Drawing Sheets

SINGLE FREQUENCY NETWORK-MANNER RELAYING OF SIDELINK SIGNALS

FIELD OF TECHNOLOGY

The following relates to wireless communications, including single frequency network (SFN)-manner relaying of sidelink signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, sidelink communications may be utilized for signaling different types of information between UEs, such as exchanging safety related messages in vehicle-to-everything (V2X) systems. While some sidelink messages may utilize sub-6 gigahertz (GHz) licensed bands, other messages (e.g., messages related to public safety) may be communicated in bandwidths corresponding to 6 GHz and 60 GHz unlicensed bands, among others. When operating in the 6 GHz and 60 GHz range, some UEs may perform beamforming alignment to compensate for potentially large propagation losses. However, beamforming alignment may be a resource intensive procedure, especially for NR sidelink communications. For example, beamforming alignment may involve multiple channel access procedures, may consume a significant amount of radio resources, and may suffer from non-trivial latency. However, a UE transmitting sidelink messages without beamforming alignment may suffer from relatively poor communication reliability due to the lack of beamforming alignment between UEs.

SUMMARY

The described techniques relate to improved methods, systems, devices, and apparatuses that support single frequency network (SFN)-manner relaying of sidelink signals. Generally, the described techniques support improved reliability for exchanging packets between UEs over sidelink without establishing or maintaining beamforming alignment between the UEs. Specifically, a first UE may establish a relay pre-agreement with a second UE supporting an SFN-manner sidelink relaying service. The pre-agreement may be reached via a publish-and-subscription procedure, where the second UE publishes (e.g., indicates) support for the relaying service and the first UE subscribes to the relaying service. In some examples, a source UE may subscribe to a relaying service at a second UE, such that the second UE may transmit sidelink messages received from the source UE to a destination UE. In some other examples, a destination UE may subscribe to a relaying service at a second UE, such that the second UE may transmit sidelink messages received from a source UE to the destination UE. The second UE (e.g., a UE currently operating as a relay) may transmit sidelink signaling in resources configured for SFN-type communications, such that multiple UEs may relay the sidelink signaling concurrently in the resources without producing destructive interference.

A method for wireless communications at a first UE is described. The method may include receiving, from a second UE, first signaling indicating a capability of the second UE to support an SFN-type relaying service, transmitting, to the second UE, second signaling indicating that the first UE is subscribing to the SFN-type relaying service at the second UE, and communicating sidelink signaling with a third UE via the second UE based on subscribing to the SFN-type relaying service at the second UE.

An apparatus for wireless communications at a first UE is described. The apparatus may include a processor, memory coupled with the processor, and instructions stored in the memory. The instructions may be executable by the processor to cause the apparatus to receive, from a second UE, first signaling indicating a capability of the second UE to support an SFN-type relaying service, transmit, to the second UE, second signaling indicating that the first UE is subscribing to the SFN-type relaying service at the second UE, and communicate sidelink signaling with a third UE via the second UE based on subscribing to the SFN-type relaying service at the second UE.

Another apparatus for wireless communications at a first UE is described. The apparatus may include means for receiving, from a second UE, first signaling indicating a capability of the second UE to support an SFN-type relaying service, means for transmitting, to the second UE, second signaling indicating that the first UE is subscribing to the SFN-type relaying service at the second UE, and means for communicating sidelink signaling with a third UE via the second UE based on subscribing to the SFN-type relaying service at the second UE.

A non-transitory computer-readable medium storing code for wireless communications at a first UE is described. The code may include instructions executable by a processor to receive, from a second UE, first signaling indicating a capability of the second UE to support an SFN-type relaying service, transmit, to the second UE, second signaling indicating that the first UE is subscribing to the SFN-type relaying service at the second UE, and communicate sidelink signaling with a third UE via the second UE based on subscribing to the SFN-type relaying service at the second UE.

In some examples of the method, apparatuses, and non-transitory computer-readable medium described herein, the communicating may include operations, features, means, or instructions for transmitting the sidelink signaling to a set of multiple UEs via the second UE based on subscribing to the SFN-type relaying service at the second UE, the set of multiple UEs including at least the third UE.

Some examples of the method, apparatuses, and non-transitory computer-readable medium described herein may further include operations, features, means, or instructions for transmitting, to the third UE, an indication that the first UE is subscribed to the SFN-type relaying service at the second UE. In some examples of the method, apparatuses, and non-transitory computer-readable medium described herein, the communicating may include operations, features, means, or instructions for receiving the sidelink signaling from the third UE via the second UE further based on transmitting the indication to the third UE.

Some examples of the method, apparatuses, and non-transitory computer-readable medium described herein may further include operations, features, means, or instructions for generating the sidelink signaling to include an indication of a request for the second UE to relay the sidelink signaling. In some examples of the method, apparatuses, and non-transitory computer-readable medium described herein, the communicating may include operations, features, means, or instructions for transmitting the generated sidelink signaling to the third UE via the second UE further based on the request for the second UE to relay the sidelink signaling.

In some examples of the method, apparatuses, and non-transitory computer-readable medium described herein, the SFN-type relaying service at the second UE corresponds to a time resource, a frequency resource, or both supporting SFN-type relaying, and the method, apparatuses, and non-transitory computer-readable medium may include further operations, features, means, or instructions for scheduling the sidelink signaling for the time resource, the frequency resource, or both based on the SFN-type relaying service, where the sidelink signaling may be communicated via the second UE based on scheduling the sidelink signaling for the time resource, the frequency resource, or both.

In some examples of the method, apparatuses, and non-transitory computer-readable medium described herein, the first signaling may be received over a radio resource control layer, an application layer, a vehicle-to-everything interface layer, or a combination thereof, the second signaling may be transmitted over the radio resource control layer, the application layer, the vehicle-to-everything interface layer, or a combination thereof, or both.

A method for wireless communications at a second UE is described. The method may include transmitting, to a first UE, first signaling indicating a capability of the second UE to support an SFN-type relaying service, receiving, from the first UE, second signaling indicating that the first UE is subscribing to the SFN-type relaying service at the second UE, receiving first sidelink signaling corresponding to the first UE and a third UE, generating second sidelink signaling corresponding to the first sidelink signaling based on the first UE subscribing to the SFN-type relaying service at the second UE, and transmitting the second sidelink signaling in a resource configured for SFN-type transmission based on the generating and on the first UE subscribing to the SFN-type relaying service at the second UE.

An apparatus for wireless communications at a second UE is described. The apparatus may include a processor, memory coupled with the processor, and instructions stored in the memory. The instructions may be executable by the processor to cause the apparatus to transmit, to a first UE, first signaling indicating a capability of the second UE to support an SFN-type relaying service, receive, from the first UE, second signaling indicating that the first UE is subscribing to the SFN-type relaying service at the second UE, receive first sidelink signaling corresponding to the first UE and a third UE, generate second sidelink signaling corresponding to the first sidelink signaling based on the first UE subscribing to the SFN-type relaying service at the second UE, and transmit the second sidelink signaling in a resource configured for SFN-type transmission based on the generating and on the first UE subscribing to the SFN-type relaying service at the second UE.

Another apparatus for wireless communications at a second UE is described. The apparatus may include means for transmitting, to a first UE, first signaling indicating a capability of the second UE to support an SFN-type relaying service, means for receiving, from the first UE, second signaling indicating that the first UE is subscribing to the SFN-type relaying service at the second UE, means for receiving first sidelink signaling corresponding to the first UE and a third UE, means for generating second sidelink signaling corresponding to the first sidelink signaling based on the first UE subscribing to the SFN-type relaying service at the second UE, and means for transmitting the second sidelink signaling in a resource configured for SFN-type transmission based on the generating and on the first UE subscribing to the SFN-type relaying service at the second UE.

A non-transitory computer-readable medium storing code for wireless communications at a second UE is described. The code may include instructions executable by a processor to transmit, to a first UE, first signaling indicating a capability of the second UE to support an SFN-type relaying service, receive, from the first UE, second signaling indicating that the first UE is subscribing to the SFN-type relaying service at the second UE, receive first sidelink signaling corresponding to the first UE and a third UE, generate second sidelink signaling corresponding to the first sidelink signaling based on the first UE subscribing to the SFN-type relaying service at the second UE, and transmit the second sidelink signaling in a resource configured for SFN-type transmission based on the generating and on the first UE subscribing to the SFN-type relaying service at the second UE.

Some examples of the method, apparatuses, and non-transitory computer-readable medium described herein may further include operations, features, means, or instructions for determining a layer 2 identifier for the first UE associated with the first UE subscribing to the SFN-type relaying service at the second UE, decoding sidelink control information for the first sidelink signaling, the sidelink control information indicating a layer 1 identifier for the first UE, and comparing the layer 1 identifier for the first UE to a portion of the layer 2 identifier for the first UE, where generating the second sidelink signaling may be further based on the comparing.

Some examples of the method, apparatuses, and non-transitory computer-readable medium described herein may further include operations, features, means, or instructions for decoding data for the first sidelink signaling based on the comparing, the data indicating the layer 2 identifier for the first UE, and determining to transmit the second sidelink signaling based on the data indicating the layer 2 identifier for the first UE.

In some examples of the method, apparatuses, and non-transitory computer-readable medium described herein, the sidelink control information indicates the layer 1 identifier for the first UE as a source identifier for the first sidelink signaling or a destination identifier for the first sidelink signaling.

Some examples of the method, apparatuses, and non-transitory computer-readable medium described herein may further include operations, features, means, or instructions for determining the resource configured for the SFN-type transmission based on control information corresponding to the first sidelink signaling, where the second sidelink signaling may be transmitted based on determining the resource.

Some examples of the method, apparatuses, and non-transitory computer-readable medium described herein may further include operations, features, means, or instructions for determining to relay any sidelink signaling corresponding to the first UE based on a subscription by the first UE to the SFN-type relaying service at the second UE, where transmitting the second sidelink signaling may be based on the determining.

Some examples of the method, apparatuses, and non-transitory computer-readable medium described herein may further include operations, features, means, or instructions for determining to relay a subset of sidelink signaling corresponding to the first UE based on a set of one or more parameters associated with the subset of sidelink signaling and on a subscription by the first UE to the SFN-type relaying service at the second UE, where transmitting the second sidelink signaling may be based on the first sidelink signaling being associated with the set of one or more parameters.

In some examples of the method, apparatuses, and non-transitory computer-readable medium described herein, the set of one or more parameters includes one or more cast types, one or more associated UEs, one or more beam indices, one or more zones, one or more priority levels, or a combination thereof.

Some examples of the method, apparatuses, and non-transitory computer-readable medium described herein may further include operations, features, means, or instructions for determining to relay the first sidelink signaling based on the first sidelink signaling including a bit value indicating a request for on-demand relaying of the first sidelink signaling by the first UE, where transmitting the second sidelink signaling may be based on the determining.

Some examples of the method, apparatuses, and non-transitory computer-readable medium described herein may further include operations, features, means, or instructions for supporting a threshold quantity of UEs subscribing to the SFN-type relaying service at the second UE, where the first sidelink signaling includes a bit field indicating the bit value, and the bit field includes a quantity of bits equal to the threshold quantity of UEs supported for subscribing to the SFN-type relaying service and assigning a bit index to the first UE based on the first UE subscribing to the SFN-type relaying service at the second UE, where the bit value indicating the request for the on-demand relaying of the first sidelink signaling by the first UE may be included in the quantity of bits of the bit field according to the assigned bit index.

Some examples of the method, apparatuses, and non-transitory computer-readable medium described herein may further include operations, features, means, or instructions for assigning a hash function to the first UE based on the first UE subscribing to the SFN-type relaying service at the second UE, where determining to relay the first sidelink signaling may be based on the bit value and the hash function assigned to the first UE.

In some examples of the method, apparatuses, and non-transitory computer-readable medium described herein, the first UE subscribes to the SFN-type relaying service at the second UE for a set of one or more transmit beams. In some examples of the method, apparatuses, and non-transitory computer-readable medium described herein, transmitting the second sidelink signaling may include operations, features, means, or instructions for transmitting the second sidelink signaling using one or more transmit beams of the set of one or more transmit beams.

Some examples of the method, apparatuses, and non-transitory computer-readable medium described herein may further include operations, features, means, or instructions for determining the one or more transmit beams, the set of one or more transmit beams, or both based on a destination identifier for the first sidelink signaling, a position of a destination UE for the first sidelink signaling, or both.

Some examples of the method, apparatuses, and non-transitory computer-readable medium described herein may further include operations, features, means, or instructions for determining the one or more transmit beams, the set of one or more transmit beams, or both based on a pseudo-random selection from a superset of transmit beams supported by the first UE.

Some examples of the method, apparatuses, and non-transitory computer-readable medium described herein may further include operations, features, means, or instructions for determining the resource configured for the SFN-type transmission based on a periodicity of resources supporting SFN-type transmissions.

Some examples of the method, apparatuses, and non-transitory computer-readable medium described herein may further include operations, features, means, or instructions for indicating, to the first UE, one or more receive beams available for the SFN-type relaying service at the second UE, where the first sidelink signaling may be received according to at least one receive beam of the one or more receive beams.

Some examples of the method, apparatuses, and non-transitory computer-readable medium described herein may further include operations, features, means, or instructions for transmitting, to a base station, the first signaling indicating the capability of the second UE to support the SFN-type relaying service and receiving, from the base station, third signaling indicating that the base station may be subscribing to the SFN-type relaying service at the second UE.

In some examples of the method, apparatuses, and non-transitory computer-readable medium described herein, the base station subscribes to the SFN-type relaying service at the second UE for one or more zones and the method, apparatuses, and non-transitory computer-readable medium may include further operations, features, means, or instructions for relaying fourth signaling between the base station and a fourth UE in a second resource configured for SFN-type transmission based on the base station being subscribed to the SFN-type relaying service at the second UE and on the fourth UE being located within the one or more zones.

In some examples of the method, apparatuses, and non-transitory computer-readable medium described herein, the first UE may be subscribed to the SFN-type relaying service at the second UE for a time period and the method, apparatuses, and non-transitory computer-readable medium may include further operations, features, means, or instructions for unsubscribing the first UE from the SFN-type relaying service at the second UE based on an expiry of the time period.

In some examples of the method, apparatuses, and non-transitory computer-readable medium described herein, the first signaling may be transmitted over a radio resource control layer, an application layer, a vehicle-to-everything interface layer, or a combination thereof, the second signaling may be received over the radio resource control layer, the application layer, the vehicle-to-everything interface layer, or a combination thereof, or both.

DETAILED DESCRIPTION

Figure 1:
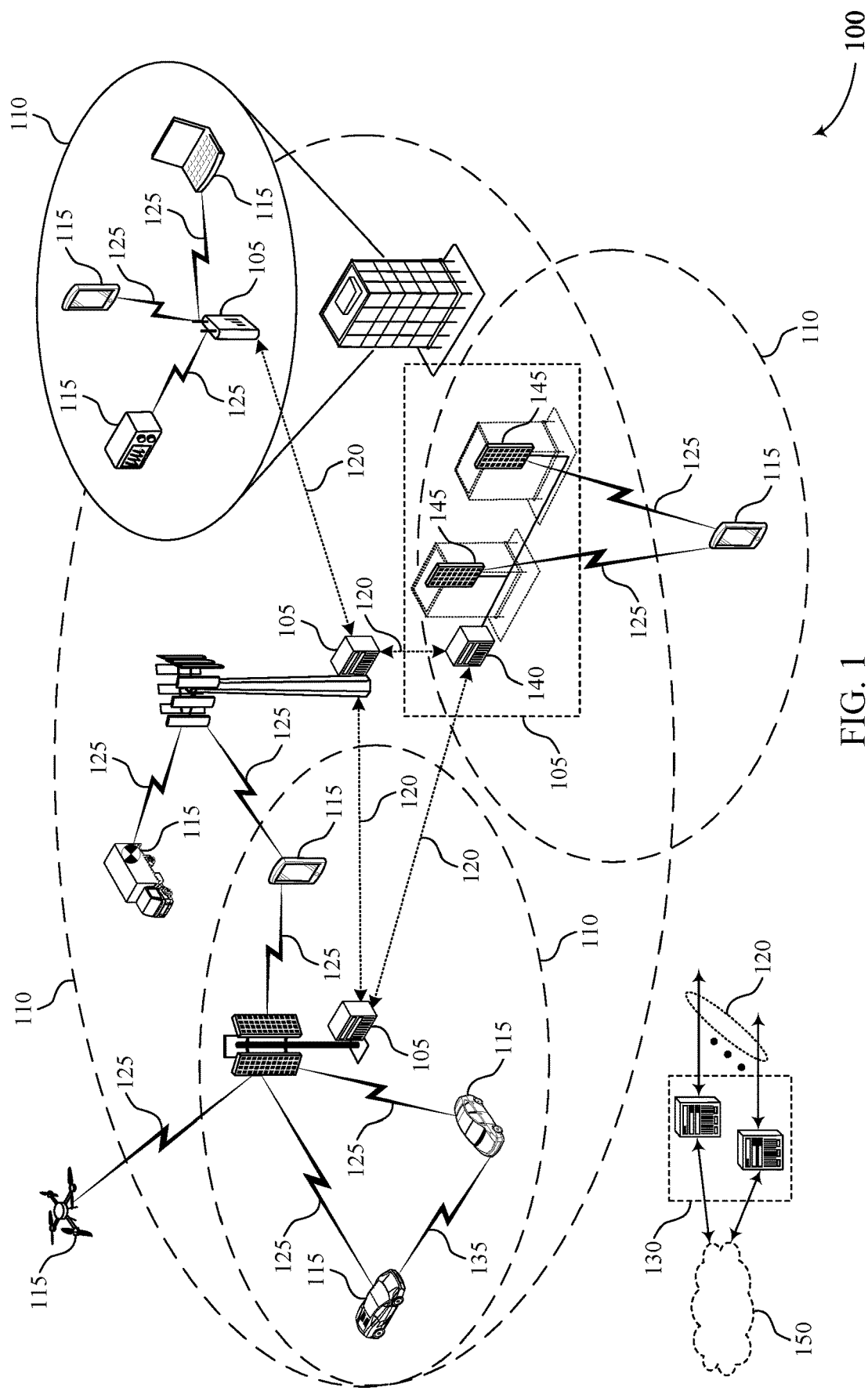
FIGS. 1 and 2 illustrate examples of wireless communications systems that support single frequency network (SFN)-manner relaying of sidelink signals in accordance with aspects of the present disclosure.

In some wireless communications systems, user equipment (UEs) may use sidelink communications for signaling information between UEs. For example, UEs (e.g., vehicles) in a vehicle-to-everything (V2X) system may exchange safety-related information, positioning information, sensor-related information, or any other information via sidelink. While some sidelink signaling may utilize sub-6 gigahertz (GHz) licensed bands, other signaling (e.g., messages related to public safety) may be communicated in bandwidths corresponding to 6 GHz and 60 GHz unlicensed bands, among others. When operating in the 6 GHz and 60 GHz range, some UEs may perform beamforming alignment to compensate for potentially large propagation losses (e.g., greater than a propagation loss threshold). However, beamforming alignment may be a relatively resource intensive procedure, especially for New Radio (NR) sidelink communications. For example, beamforming alignment may involve multiple channel access procedures, may consume a significant amount of radio resources, may suffer from non-trivial latency, or any combination thereof. However, a UE transmitting sidelink signaling without beamforming alignment may suffer from relatively poor communication reliability (e.g., below a reliability threshold) due to the lack of beamforming alignment between the UEs.

Aspects of the present disclosure describe UEs performing single frequency network (SFN)-manner relaying over sidelink channels to improve communication reliability (e.g., without establishing or maintaining beamforming alignment between UEs). Specifically, a first UE (e.g., a source UE transmitting sidelink signaling, a destination UE receiving sidelink signaling) may establish a pre-agreement with a second UE, the pre-agreement configuring the second UE to perform SFN-manner relaying for the first UE. The pre-agreement may be reached via a publish-and-subscription procedure. For example, the second UE may publish an indication of a relaying service supported by the second UE. The first UE may subscribe to the relaying service at the second UE to enable SFN-manner relaying by the second UE.

For example, after the pre-agreement, the second UE may receive physical sidelink control channel (PSCCH) signaling, physical sidelink shared channel (PSSCH) signaling, or both and may decode sidelink control information (SCI) associated with the received sidelink signaling (e.g., even if the second UE is not the intended destination UE for the sidelink signaling). If the second UE successfully decodes the sidelink signaling and determines the sidelink signaling corresponds to a relay subscription (e.g., is received from a source UE subscribed to the SFN-type relaying service or is transmitted to a destination UE subscribed to the SFN-type relaying service), the second UE may access one or more resources configured for joint transmission of sidelink signaling in an SFN-manner. The second UE may reconstruct the received PSCCH, PSSCH, or both and may relay the reconstructed sidelink signaling in the resources configured for SFN-type transmissions. By relaying the sidelink signaling in SFN-type transmissions, multiple UEs may relay the signaling in a shared resource without causing destructive interference to the signaling. Utilizing a publish-and-subscription model for relaying may enable a source UE to communicate sidelink signaling with a destination UE without performing beamforming alignment procedures, for example, due to another UE relaying the sidelink signaling in the SFN resources to increase the signaling range, spatial diversity, or both. Such techniques may decrease sidelink signaling overhead (e.g., by decreasing a quantity of retransmissions), decrease latency, and increase overall network efficiency associated with sidelink communications.

Aspects of the disclosure are initially described in the context of wireless communications systems. Aspects of the disclosure are further illustrated by and described with reference to relaying resources and a process flow. Aspects of the disclosure are further illustrated by and described with reference to apparatus diagrams, system diagrams, and flowcharts that relate to SFN-manner relaying of sidelink signals.

FIG. 1 illustrates an example of a wireless communications system 100 that supports single frequency network-manner relaying of sidelink signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems 100 (e.g., 5G NR communications systems or other systems), sidelink may be utilized for V2X communications, which may support an exchange of messages (e.g., safety-related messages or other messages) between nearby UEs, for example, over sub-6 GHz licensed bands. Sidelink operations may support two radio resource allocations (e.g., two channel access modes). Mode 1 may correspond to in-coverage deployments, where a sidelink UE 115 receives grants from a base station 105 for channel access. Mode 2 may correspond to autonomous deployment, where sidelink UEs 115 utilize sensing to perform distributed channel access. In some examples, such as in 5G NR, sidelink may support broadcast communications, groupcast communications, unicast communications, or a combination thereof. Additionally or alternatively, a UE 115 transmitting a sidelink message may request feedback for the sidelink message (e.g., an ACK/NACK response for a unicast transmission, a NACK-only or ACK/NACK response for a groupcast transmission).

Sidelink channel access may involve a physical sidelink control channel (PSCCH) coupled with a physical sidelink shared channel (PSSCH) occupying at least one subchannel and carrying one transport block (TB) of data. The PSCCH may carry stage-one SCI, which may indicate radio resource occupancy as well as set-ups for PSSCH decoding. The PSSCH may carry stage-two SCI and data, where the stage-two SCI may include control information such as a Layer 1 (L1) source identifier (ID), an L1 destination ID, a request for hybrid automatic repeat request (HARM) responses, or a combination thereof.

In some examples, one or more UEs 115 may support discontinuous reception (DRX), partial sensing, or both to conserve battery resources (e.g., if communicating over sidelink channels). Additionally or alternatively, UEs 115 may support inter-UE coordination to improve the communication reliability associated with Mode 2-based channel access. In some cases, physical and medium access control (MAC) layer signaling (e.g., for uplink, downlink, sidelink) may be used in sub-6 GHz licensed bands. However, other bands may be used to improve resource utilization.

Some wireless communications systems 100, such as those utilizing 5G NR technology or other radio access technologies (RATs), may use sidelink communications in specific bandwidths to support the communication of specific information (e.g., information related to public safety). In some such cases, the sidelink communications may not correspond to sub-6 GHz licensed bands. However, the sidelink communications may utilize bandwidths associated with 6 GHz or 60 GHz unlicensed bands. In some cases, beamforming alignment may be performed in higher frequency bands (e.g., millimeter wave (mmWave) bands, 6 GHz bands, 60 GHz bands) to compensate for significant propagation losses (e.g., greater propagation losses relative to propagation losses in sub-6 GHz bands). While propagation losses over the 6 GHz unlicensed band may be relatively low, transmission power limits (e.g., due to regulations) may result in relatively poor communication reliability unless beamforming alignment procedures are performed between UEs 115 communicating over sidelink.

In some cases, sidelink communication protocols or procedures in specific bands (e.g., 6 GHz to 60 GHz bands) may further increase a resource burden associated with beamforming alignment for sidelink (e.g., especially in NR sidelink). For example, UEs 115 may not use standalone reference signals, such as channel state information-reference signals (CSI-RS) or sounding reference signals (SRS) in Uu, in sidelink operations. Consequently, beamforming alignment may involve multiple channel accesses, which may consume a significant amount of radio resources corresponding to signaling overhead and result in non-trivial latency before UEs 115 achieve beamforming alignment.

In some cases, however, relaying of sidelink signaling between UEs 115 may improve communication reliability, for example, without establishing or maintaining beamforming alignment. In some examples, UEs 115 may use multi-hop relaying for sidelink signaling. Additionally or alternatively, the UEs 115 may use SFN-type transmission for relaying sidelink signaling. In some cases, the sidelink relaying may be set up based on a pre-agreement between UEs 115. For example, a first UE 115 may proactively subscribe to an SFN-type relaying service at a second UE 115, such that the second UE 115 may relay sidelink signaling for the first UE 115 (e.g., sidelink signaling transmitted by or to the first UE 115) according to terms of the service. Establishing an SFN-type relaying relationship may support increased performance, improved communication reliability, reduced interference footprint, decreased power consumption, or a combination thereof for UEs 115 communicating over sidelink channels. The SFN-type relaying pre-agreement may be reached via a publish-and-subscription procedure. For example, a UE 115 may publish support for a relaying service (e.g., based on a Layer 3 (L3) configuration from SIB, a pre-configuration, a radio resource control (RRC) message, or some combination thereof). Another UE 115 may subscribe to the service, such that the UE 115 supporting the relaying service may relay messages for the subscribing UE 115. In some cases, a source UE 115 may subscribe to the service, such that the relay UE 115 may relay sidelink messages transmitted by the source UE 115. In some other cases, a destination UE 115 may subscribe to the service, such that the relay UE 115 may relay sidelink messages transmitted to the destination UE 115. The relay UE 115 may relay the sidelink messages in one or more resources configured for SFN-type transmissions (e.g., to reduce destructive interference if multiple UEs 115 relay the sidelink messages).

Figure 2:
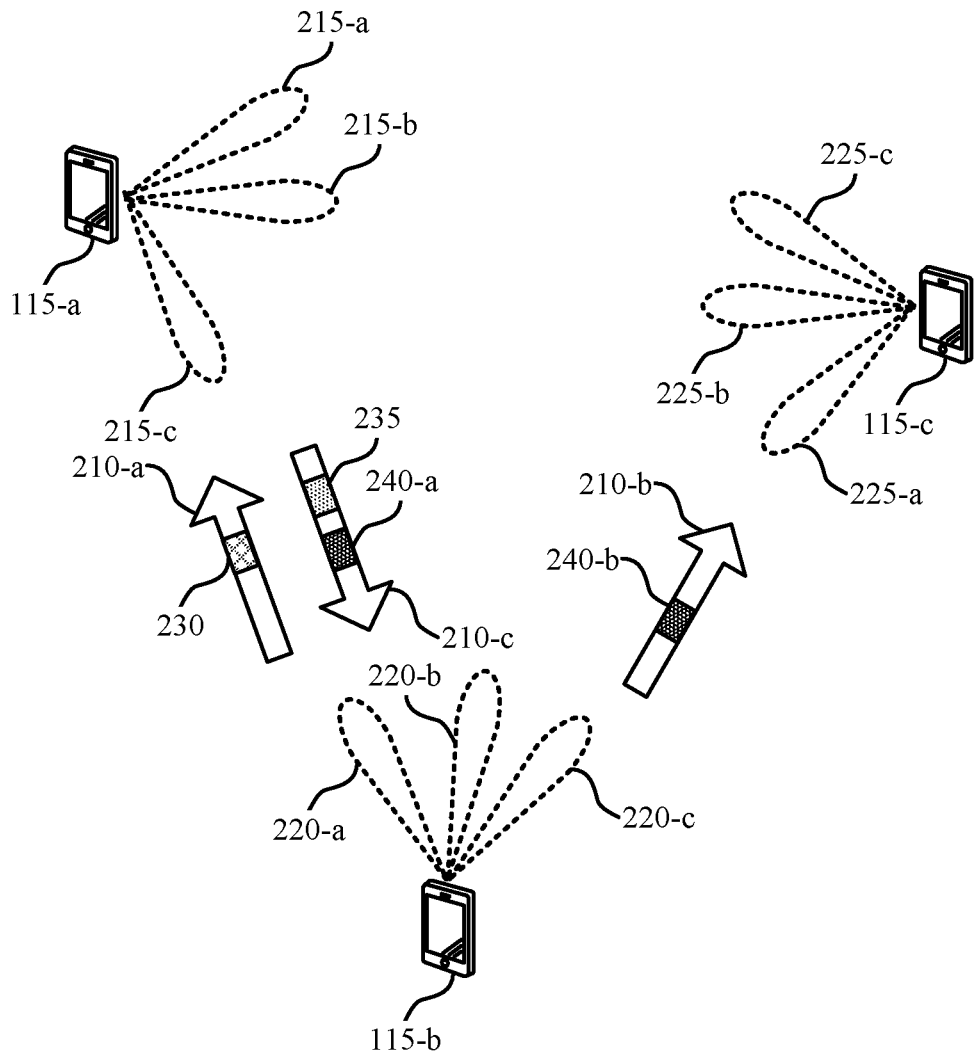

FIG. 2 illustrates an example of a wireless communications system 200 that supports SFN-manner relaying of sidelink signals in accordance with aspects of the present disclosure. The wireless communications system 200 may implement or be implemented by one or more aspects of the wireless communications system 100. For example, the wireless communications system 200 may include a UE 115-a, a UE 115-b, and a UE 115-c, which may be examples of the UEs 115 as described with reference to FIG. 1. In some examples, the UE 115-a, the UE 115-b, and the UE 115-c may perform communications over sidelink. Specifically, the UE 115-a, the UE 115-b, and the UE 115-c may support a publish-and-subscription procedure for establishing a relay relationship (e.g., between some combination of the UE 115-a, the UE 115-b, and the UE 115-c). The relay relationship may support SFN-manner relaying, for example, such that multiple UEs 115 may transmit the same sidelink signaling 240 in the same resources configured for SFN-manner transmission without causing destructive interference.

In some examples, the UE 115-a, the UE 115-b, and the UE 115-c may be examples of vehicles operating in an environment supporting V2X communications. The vehicles may communicate with one another using sidelink communications to exchange information (e.g., for public safety or other V2X information). In some systems, due to a relatively high rate of messaging coupled with relatively dense urban environments, the UE 115-a, the UE 115-b, the UE 115-c, or some combination thereof may utilize beamformed communications to improve communication reliability for sidelink transmissions. However, in some cases, due to the mobility of the UEs 115, in order to reduce latency or signaling overhead, or both, one or more UEs 115 may refrain from establishing beamformed alignment between specific UEs 115.

For example, the UE 115-a (e.g., a source UE) may determine to transmit information to the UE 115-c (e.g., a destination UE) via sidelink. In some examples, the UE 115-a may perform a beam sweeping procedure. For example, the source UE may utilize a beam 215-a, a beam 215-*b*, and a beam 215-*c* to perform beam sweeping. In some such examples, the destination UE (e.g., the UE 115-*c*) may perform beam alignment procedures using a beam 225-*a*, a beam 225-*b*, and a beam 225-*c*. In some cases, the beam alignment procedure may fail. For example, the beam alignment procedure may indicate relatively low signaling reliability or relatively poor channel metrics between the UE 115-*a* and the UE 115-*c* (e.g., for any beam pair). In some other cases, the UE 115-*a* and the UE 115-*c* may refrain from performing beam alignment procedures. As such, the UE 115-*a* may fail to determine a beam pair (e.g., a transmit beam 215 at the UE 115-*a* and a receive beam 225 at the UE 115-*c*) for transmitting the sidelink signaling 240 directly from the UE 115-*a* to the UE 115-*c*.

Instead, the source UE may use one or more pre-agreements with one or more UEs 115 (e.g., the UE 115-*b*) to relay the information via SFN-type transmissions to the destination UE. For example, the UE 115-*a* may subscribe to a relaying service supported by the UE 115-*b*, and the UE 115-*b* may relay sidelink signaling 240 for the UE 115-*a* to improve the likelihood that the UE 115-*c* successfully receives the sidelink signaling 240. Additionally or alternatively, a destination UE (e.g., the UE 115-*c*) may subscribe to one or more relaying services at one or more UEs 115, such that a relay UE 115 (e.g., the UE 115-*b*, which may also be referred to as a helper UE) may relay signaling targeted to the destination UE. As illustrated, the source UE may transmit sidelink signaling 240-*a*. The source UE may transmit the sidelink signaling 240-*a* using a beam 215-*c* directed towards the relay UE (e.g., based on subscribing to a relaying service at the relay UE), may transmit the sidelink signaling 240-*a* using a beam 215 generally directed towards the destination UE, or may transmit the sidelink signaling 240-*a* using a beam sweeping procedure. The relay UE may detect the sidelink signaling 240-*a*, determine that the sidelink signaling 240-*a* corresponds to a UE 115 subscribing to the SFN-manner relaying service at the relay UE (e.g., the subscribing UE is the source or destination UE for the packet), and may relay the sidelink signaling 240-*a* (e.g., as sidelink signaling 240-*b*) to the destination UE in one or more resources configured for SFN-type transmissions. The relay UE may transmit the sidelink signaling 240-*b* using a beam 220-*c* directed towards the destination UE or may perform a beam sweeping procedure (e.g., over a beam 220-*a*, a beam 220-*b*, and a beam 220-*c*) to relay the sidelink signaling 240-*b*. The relay UE (e.g., the UE 115-*b*) may utilize an SFN-type transmission to relay sidelink information between the source UE and the destination UE to improve communication reliability over sidelink (e.g., especially if the UE 115-*a* and the UE 115-*c* do not currently have beam alignment, if there is blocking between the UE 115-*a* and the UE 115-*c*, or both).

The source UE, the destination UE, or both may establish a relay relationship with the helper UE using a publish-and-subscribe procedure. For example, the UE 115-*b* may transmit a publish signal 230 over a sidelink communication channel 210-*a*. The publish signal 230 may indicate (e.g., publish) a capability of the UE 115-*b* to provide an SFN-type relaying service. In some cases, the publish signal 230 may include one or more parameters associated with the SFN-type relaying service. Based on (e.g., in response to) the publish signal 230, the UE 115-*a* may transmit, to the UE 115-*b*, a subscription signal 235 over a sidelink communication channel 210-*c* indicating that the UE 115-*a* is subscribing to the SFN-type relaying service provided by the UE 115-*b*. The subscription signal 235 may establish a pre-agreement between the UE 115-*a* and the UE 115-*b* for the UE 115-*b* to forward sidelink signaling 240 transmitted by the UE 115-*a* in an SFN-manner. Additionally or alternatively, the UE 115-*c* may subscribe to the SFN-type relaying service at the UE 115-*b*. If a UE 115-*c* subscribes to the relaying service as a destination UE, the UE 115-*c* may additionally forward the subscription to a source UE (e.g., a transmitter to the UE 115-*c*). The publish-and-subscription handshaking may include a confirmation, commitment, or both from the UE 115-*b* indicating a commitment to perform SFN-manner relaying for the UE 115-*a*, the UE 115-*c*, or both. For example, the UE 115-*b* may transmit a confirmation or commitment messages to the UE 115-*a* in response to the subscription signal 235. The UE 115-*b* may associate a Layer 2 (L2) ID of another UE 115 with a subscription to the relaying service, such that the UE 115-*b* may relay sidelink signaling 240 associated with that L2 ID. In some cases, such publish-and-subscription handshaking between UEs 115 may be performed over a PC5-RRC layer, an application (APP) layer, a V2X interface layer, or some combination thereof. Additionally or alternatively, a UE 115 may subscribe to the SFN-type relaying service for a relatively short amount of time (e.g., for a defined or configured threshold time before the subscription is dropped). The UE 115-*b* may concurrently support one or more relaying agreements with one or more source UEs, one or more destination UEs, or both.

If the UE 115-*b* is operating as a relay UE, the UE 115-*b* may monitor one or more sidelink communication channels 210 for sidelink signaling 240. The UE 115-*b* may decode SCI for detected sidelink signaling 240. If the UE 115-*b* determines that the UE 115-*b* is the destination for the sidelink signaling 240, the UE 115-*b* may decode the data associated with the sidelink signaling (e.g., the PSSCH information). Additionally or alternatively, if the UE 115-*b* determines that a source ID or a destination ID in the SCI corresponds to UE subscribing to the relaying service at the UE 115-*b*, the UE 115-*b* may decode the data associated with the sidelink signaling. Otherwise, the UE 115-*b* may conserve power by refraining from decoding the PSSCH portion of the sidelink signaling 240.

For example, the UE 115-*b* may decode stage-one SCI, stage-two SCI, or both for the sidelink signaling 240-*a*. The UE 115-*b* may determine a source ID and a destination ID indicated by the SCI. For example, stage-two SCI may indicate an L1 source ID, an L1 destination ID, or both. The UE 115-*b* may store one or more indications of L2 IDs with subscriptions to the SFN-type relaying service at the UE 115-*b*. If the L1 source ID or L1 destination ID corresponds to an L2 ID subscribed to the relaying service, the UE 115-*b* may further decode the PSSCH. For example, if the L1 ID corresponds to (e.g., equals) a set of least significant bits (LSBs) of the L2 ID (e.g., the L1 source ID corresponds to the 8 LSBs of the L2 ID for the UE 115-*a* subscribing to the relaying service as a source UE or the L1 destination ID corresponds to the 16 LSBs of the L2 ID for the UE 115-*c* subscribing to the relaying service as a destination UE), the UE 115-*b* may determine that the received sidelink signaling 240-*a* potentially corresponds to a UE 115 subscribing to the relaying service. The UE 115-*b* may decode the PSSCH portion of the sidelink signaling 240-*a* and may check the full L2 ID in the decoded PSSCH portion (e.g., to confirm that the sidelink signaling 240-*a* corresponds to a UE 115 subscribing to the SFN-type relaying service. By checking the full L2 ID in the PSSCH, the UE 115-*b* may avoid L1 ID collision. Specifically, the UE 115-*b* may refrain from relaying sidelink signaling 240-*a* if an L1 source or destination ID in the SCI corresponds to the LSBs of the L2 ID of the subscribed UE, but the L2 source or destination ID in the PSSCH does not correspond to the L2 ID of the subscribed UE.

If the UE 115-*b* successfully decodes the PSSCH and determines to relay the sidelink signaling 240-*a*, the UE 115-*b* may reconstruct the received sidelink signaling 240-*a* as sidelink signaling 240-*b* for transmission. The UE 115-*b* may access pre-specified resources (e.g., specified by control information received over a PSSCH, a PSCCH, or both) to jointly transmit in an SFN-manner the reconstructed sidelink signaling 240-*b* (e.g., the PSCCH portion, the PSSCH portion, or both of the sidelink signaling 240-*b*). In some cases, the UE 115-*b* may utilize a common frequency for SFN-type transmissions. In some other cases, the UE 115-*b* may utilize a set of frequencies from a resource pool for SFN-type transmissions. Other UEs 115 transmitting the sidelink signaling 240-*b* (e.g., the source UE, other relay UEs) may use the same resources for transmitting the sidelink signaling 240 in an SFN manner to improve the spatial diversity of the sidelink signaling 240 transmissions.

In some cases, the commitment from the UE 115-*b* to the subscribed UE (e.g., the source UE) for SFN-manner relaying may be semi-static. For example, the UE 115-*b* may perform an SFN-manner retransmission for any transmissions (e.g., no matter the cast type or destination ID) received at the UE 115-*b* from the source UE. Alternatively, the UE 115-*b* may perform SFN-manner retransmissions for a subset of transmissions received at the UE 115-*b* from the source UE. In some cases, the subset of transmissions may be determined based on a cast type, a destination ID, a source ID, or a combination of these or other parameters. For example, if the UE 115-*b* receives sidelink signaling 240 associated with a UE 115 subscribed to the relaying service at the UE 115-*b*, the UE 115-*b* may determine whether to relay the sidelink signaling 240 based on one or more parameters, criteria, or thresholds associated with the received sidelink signaling 240. Additionally or alternatively, the one or more parameters for determining whether to relay sidelink signaling 240 may include a set of beam indices (e.g., beam space SFN-manner relaying) corresponding to the received sidelink signaling 240, corresponding to a direction for relaying the sidelink signaling 240, or both. Additionally or alternatively, the SFN-manner relaying may be based on a set of zones. For example, the UE 115-*b* may determine to relay sidelink signaling 240 if the source UE of the sidelink signaling 240 is in one or more specific geographic zones, if the destination UE of the sidelink signaling 240 is in one or more specific geographic zones, or if the relay UE is in one or more specific geographic zones. In some cases, the zones may be configured by the network (e.g., by a base station 105) or may be pre-configured at or configured by the UEs 115.

Additionally or alternatively, the UE 115-*b* may support relaying sidelink signaling 240 on demand for subscribed UEs 115. In some examples, the UE 115-*b* may support relaying services for a threshold number of UEs, the UE 115-*a* may support subscribing to a threshold number of relay services at UEs, or both. That is, the UE 115-*b* may concurrently support up to a threshold number of UEs subscribed under the publish-and-subscription model of SFN-manner relaying, the UE 115-*a* may concurrently support up to a threshold number of subscriptions under the publish-and-subscription model of SFN-manner relaying, or both.

The UEs 115 may use a bit field in SCI to request relaying of sidelink signaling 240, where a size of the bit field, m, may correspond to a threshold number of UEs. In a first example, the UE 115-*b* may assign a bit index to one or more UEs 115 that are subscribed to the publish-and-subscription model. For example, the UE 115-*b* may assign the UE 115-*a* (e.g., a subscribed UE) an index within a range (e.g., a range of m values) in the publish-subscription handshaking so that the UE 115-*b* may be addressed by the UE 115-*a*. The UE 115-*a* may use the bit field and the UE-specific assigned bit index to request SFN-manner relaying on demand. For example, if the UE 115-*a* determines that a UE 115 should relay a message, the UE 115-*a* may set a bit value in the bit field corresponding to the assigned bit index to a specific value (e.g., "1") to request relaying of the message. The UE 115-*b* may read the m-bit field (e.g., from a PSCCH portion, PSSCH portion, or both of the sidelink signaling 240) transmitted by the UE 115-*a*. The UE 115-*b* may perform an SFN-manner retransmission of the sidelink signaling 240 if a bit corresponding to the index assigned to the source UE 115 is set to a specific value (e.g., "1"). In this way, the UE 115-*b* may support up to m specific UEs 115 requesting relaying of sidelink signaling 240 by the UE 115-*b*. In a second example, the UE 115-*b* may be assigned an index with a specific range (e.g., of m values) by the UE 115-*b* or the subscribing UE. The UE 115-*a* may set bit values in the bit field to indicate which UEs 115 are to relay the sidelink signaling 240. For example, the UE 115-*b* may read the m-bit field from the sidelink signaling 240 and may perform SFN-manner retransmission of the sidelink signaling 240 if the bit corresponding to the bit index for the UE 115-*b* is set to a specific value (e.g., "1"). In this way, the UE 115-*a* may subscribe to—or otherwise request—up to m specific UEs 115 to relay sidelink signaling 240.

Additionally or alternatively, the UEs 115 may use a hash function or other function or algorithm to request relaying of sidelink signaling 240. In a first example, the UE 115-*b* may assign the UE 115-*a* a hash function with an output that is within a specified range, for example, m. The UE 115-*a* may include an m-bit field in sidelink signaling 240 to support requesting SFN-manner relaying on demand for the UE 115-*a*. The UE 115-*a* may set a bit in the bit field corresponding to the output of the hash function for the UE 115-*a* to a specific value (e.g., "1") to request relaying. The UE 115-*b* may receive the sidelink signaling 240 and determine to relay the sidelink signaling 240 based on the bit value in the bit field corresponding to the output of the hash function indicating to relay the sidelink signaling 240. In a second examples, the UE 115-*b* may be assigned a hash function with an output within a specified range (e.g., a range of m values), for example, by the UE 115-*b* or the UE 115-*a*. The UE 115-*a* may include an m-bit field in sidelink signaling 240 to support requesting SFN-manner relaying on demand from one or more specific relay UEs 115. For example, the UE 115-*a* may set a bit in the bit field corresponding to the output of the hash function for the UE 115-*b* to a specific value (e.g., "1") to request relaying of the sidelink signaling 240 by the UE 115-*b*. The UE 115-*b* may receive the sidelink signaling 240, read the m-bit field (e.g., from the PSCCH portion, the PSSCH portion, or both of the sidelink signaling 240), and determine to relay the sidelink signaling 240 in one or more resources configured for SFN-manner transmissions based on the bit corresponding to the output of the hash function for the UE 115-*b* being set to a specific value (e.g., "1") indicating a relaying request. By utilizing hash functions (or other algorithms or functions), the UE 115-*a* may subscribe to—and request relaying from—more than m relay UEs using an m-bit field.

In some examples, the commitment from the UE 115-*b* to a subscribing UE 115 (e.g., a source UE or destination UE)

to perform SFN-manner retransmissions may include a set of transmit beams to be used by the UE 115-*b* in performing the SFN-manner retransmission. For example, the set of transmit beams may depend on the destination (e.g., the destination UE) of the sidelink signaling 240 to be relayed. The UE 115-*b* may select a set of one or more transmit beams directed towards the destination (e.g., the destination UE, a set of destination UEs). In some other examples, the set of transmit beams selected for relaying may be destination independent. For example, destination independent transmit beams may be used if the UE 115-*b* is transmitting the relayed sidelink signaling 240 in a broadcast transmission, a groupcast transmission, towards a UE 115 with positioning not known to the UE 115-*b*, or towards a destination UE 115 without a specific receive beam configuration. Additionally or alternatively, the set of transmit beams used for relaying may be randomly chosen (e.g., based on a pseudo-random selection procedure) from a set of one or more transmit beams supported by the UE 115-*b* (e.g., a pre-specified set of one or more beams).

In some cases, such as when operating in sidelink Mode 1, the UE 115-*b* may further provide the publish-and-subscription relaying service to a base station 105. For example, the base station 105 may receive the publish signal 230 from the UE 115-*b* and may determine to subscribe to the SFN-manner relaying service provided by the UE 115-*b*. The base station 105 may respond to the publish signal 230 with a subscription signal 235 subscribing to the relaying service at the UE 115-*b*. In some cases, in the subscription signal 235, the base station 105 may indicate a set of one or more second UEs 115 for SFN-manner relaying. The set of one or more second UEs 115 may be UEs 115 for which the UE 115-*b* may relay signaling based on the base station's subscription. For example, the UE 115-*b* may relay signaling to or from the UEs 115 in the set of one or more second UEs 115, including downlink signaling from the base station 105 to a UE 115 of the set, uplink signaling to the base station 105 from a UE 115 of the set, or sidelink signaling from or to a UE 115 in the set. The UE 115-*b* may respond to the subscription signal 235 from the base station 105 with signaling indicating a confirmation or commitment of the UE 115-*b* to provide SFN-manner relaying services for the base station 105, the set of one or more second UEs, or both. The base station 105 may forward the subscription information to any UEs 115 involved in the relaying (e.g., the UEs 115 of the set of one or more second UEs).

In some cases, instead of subscribing for a set of one or more second UEs, the base station 105 may subscribe to SFN-manner relaying for a set of zones (e.g., geographic zones). In some such cases, the UE 115-*b* may decode signaling to determine whether to relay the signaling (e.g., sidelink signaling 240) even if the UE 115-*b* is not an intended receiver of the signaling. For example, the UE 115-*b* may decode the signaling if the UE 115-*b* determines that the signaling is transmitted towards a destination UE located within a zone associated with the set of zones configured for the subscription. Additionally or alternatively, the UE 115-*b* may decode the signaling if the signaling is transmitted by a source UE within a zone associated with the set of zones. In some cases, the UE 115-*b* may decode the signaling if the signaling is both transmitted by a source UE within a zone associated with the set of zones and the signaling is transmitted towards a destination UE within a zone associated with the set of zones.

Accordingly, once a pre-agreement has been established between a subscriber UE 115 (e.g., a source UE or a destination UE) and the UE 115-*b*, the UE 115-*b* may decode sidelink signaling 240-*a* associated with the subscriber UE 115 and reconstruct the sidelink signaling 240-*b* for relaying in one or more resources configured for SFN-type transmissions. Based on the commitment to perform SFN-manner relaying, the UE 115-*b* may retransmit the sidelink signaling 240-*a* received from a source UE as sidelink signaling 240-*b* over a sidelink communication channel 210-*b* to a destination UE. Multiple UEs 115 (e.g., the source UE and one or more relay UEs) may transmit the sidelink signaling 240 in the resources configured for SFN-type transmissions, where the SFN-type transmissions support transmissions in overlapping resources without causing significant destructive interference (e.g., above an interference threshold). The subscriber UE may unsubscribe from the SFN-manner relaying service provided by the UE 115-*b* based on an expired time duration, an unsubscribe signal, or both.

Figure 3:
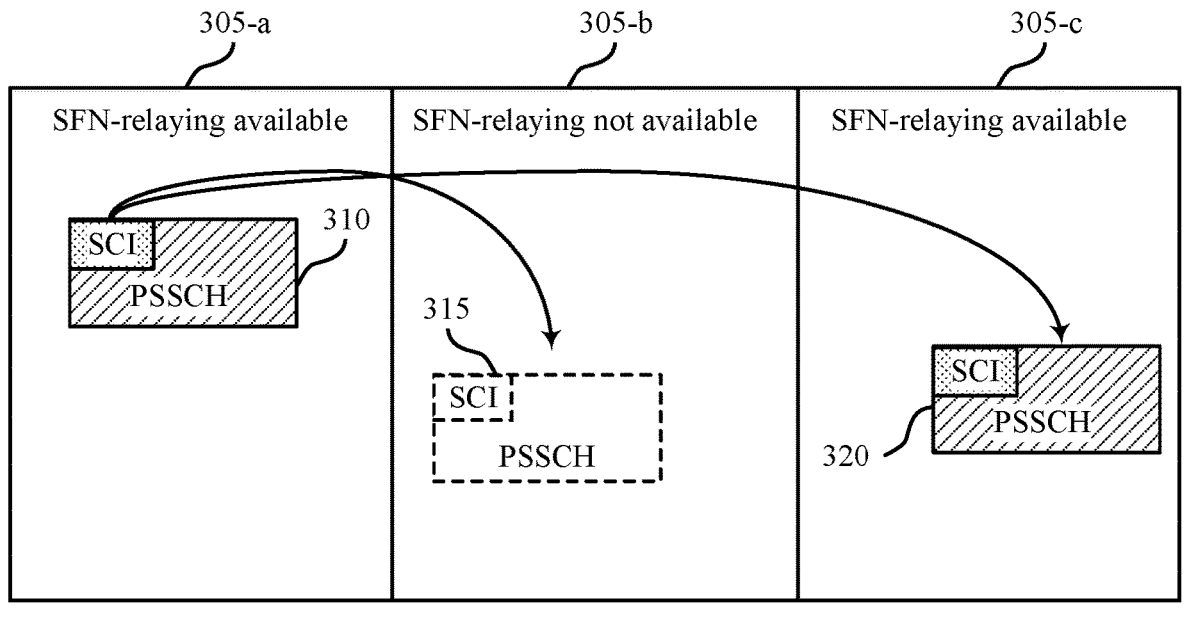
FIG. 3 illustrates an example of relaying resources that support SFN-manner relaying of sidelink signals in accordance with aspects of the present disclosure.

FIG. 3 illustrates an example of relaying resources 300 that support SFN-manner relaying of sidelink signals in accordance with aspects of the present disclosure. The relaying resources 300 may include one or more aspects of the wireless communications system 100 and the wireless communications system 200. For example, the relaying resources 300 may be used by UEs 115 performing SFN-manner relaying of sidelink signaling. The sidelink signaling performed in the relaying resources 300 may be performed by UEs 115, such as a UE 115-*a*, a UE 115-*b*, or both described with reference to FIGS. 1 and 2. The relaying resources 300 may support SFN-type transmissions of sidelink signaling to support overlapping transmissions by multiple UEs 115, improving spatial diversity while reducing resource overhead and destructive interference.

The relaying resources 300 provide available resources for SFN-manner relaying in specific slots (e.g., time intervals). The availability of SFN-manner relaying may correspond to periodic (or aperiodic) windows in the time domain, the frequency domain, or both. For example, SFN-manner relaying may be available within one or more resource windows (e.g., a window 305-*a* and a window 305-*c*), but may be unavailable within one or more other resource windows (e.g., a window 305-*b*). A first UE 115 may subscribe to an SFN-manner relaying service provided by a second UE 115, for example, using a publish-and-subscribe procedure. For example, the subscription may configure the second UE 115 to relay sidelink messages transmitted by the first UE 115, transmitted to the first UE 115, or both. The second UE 115 may use the relaying resources 300 to relay sidelink signaling according to one or more subscriptions.

For example, the first UE 115 may subscribe to the relaying service for the second UE 115 to relay sidelink signaling transmitted by the first UE 115 (e.g., if the source ID for the sidelink signaling is the first UE's ID). The first UE 115 may transmit sidelink signaling 310 in the window 305-*a*. Alternatively, the first UE 115 may transmit the sidelink signaling 310 in a window 305-*b* that does not support SFN-relaying. The sidelink signaling 310 may include SCI 325, a PSSCH portion 330, or both. In some cases, the SCI 325 may indicate a source UE of the sidelink signaling 310, one or more destination UEs for the sidelink signaling 310, or both. Additionally or alternatively, the SCI 325 may indicate resources for relaying the sidelink signaling 310. For example, the SCI 325 may indicate resources in the window 305-*b*, resources in the window 305-*c*, or both. In some cases, the second UE 115 may determine to relay the sidelink signaling in resources configured for SFN-type transmissions and may determine to refrain from relaying the sidelink signaling in other resources. For example, the second UE 115 may refrain from relaying the sidelink signaling 310 in the window 305-*b* as sidelink signaling 315 (e.g., because the window 305-*b* fails to support resources configured for SFN-type transmissions), and the second UE 115 may instead relay the sidelink signaling 310 in the window 305-*c* as sidelink signaling 320. In some cases, the first UE 115, the second UE 115, or both may retransmit the sidelink signaling 320 in later resources. For example, the first UE 115 may retransmit the sidelink signaling in resources in the window 305-*c*. The first UE 115 may retransmit the sidelink signaling in overlapping resources with the second UE 115 relaying the sidelink signaling. Due to the SFN-manner transmission, the transmissions may avoid or mitigate causing destructive interference, such that a third UE 115 may receive the sidelink signaling from the first UE 115, the second UE 115, or both. Additionally or alternatively, the second UE 115 may relay the sidelink signaling in additional resources as one or more retransmissions. Based on the availability of resources supporting SFN-manner relaying, the UEs 115 may perform sidelink communications using a set of one or more beams 355 to one or more destination UEs 115 (e.g., via unicast, groupcast, or broadcast signaling).

In some examples, the first UE 115 may determine the resources (e.g., specific time resources, specific frequency resources) in which to transmit the sidelink signaling 310 to exploit the SFN-manner relaying service according to the availability of resources for the second UE 115. For example, in some cases, the first UE 115 may refrain from transmitting sidelink signaling intended for SFN-manner relaying (or may refrain from scheduling relaying resources or retransmissions) within windows 305 where SFN-manner relaying is unavailable.

In some examples, the availability of SFN-manner relaying may further be based on a set of one or more receive beams used by the second UE 115 to receive sidelink signaling (e.g., PSCCH information, PSSCH information, or both) transmitted by the first UE 115. For example, the second UE 115 may utilize the set of receive beams within the window 305-*a* to receive the sidelink signaling 310. The first UE 115 may transmit the sidelink signaling 310 in resources in which the second UE 115 is monitoring a sidelink channel using receive beams directed towards the first UE 115. Based on receiving the PSSCH portion 330, the second UE 115 may relay the PSSCH portion 330 in the window 305-*c* (e.g., based on scheduling in the SCI 325 or based on available resources, such as in a resource pool for SFN-manner transmissions). As such, the scheduling of transmissions (e.g., initial transmissions, retransmissions, relayed transmissions) may be based on the relaying resources 300, the beam configurations of the UEs 115, or both.

Figure 4:
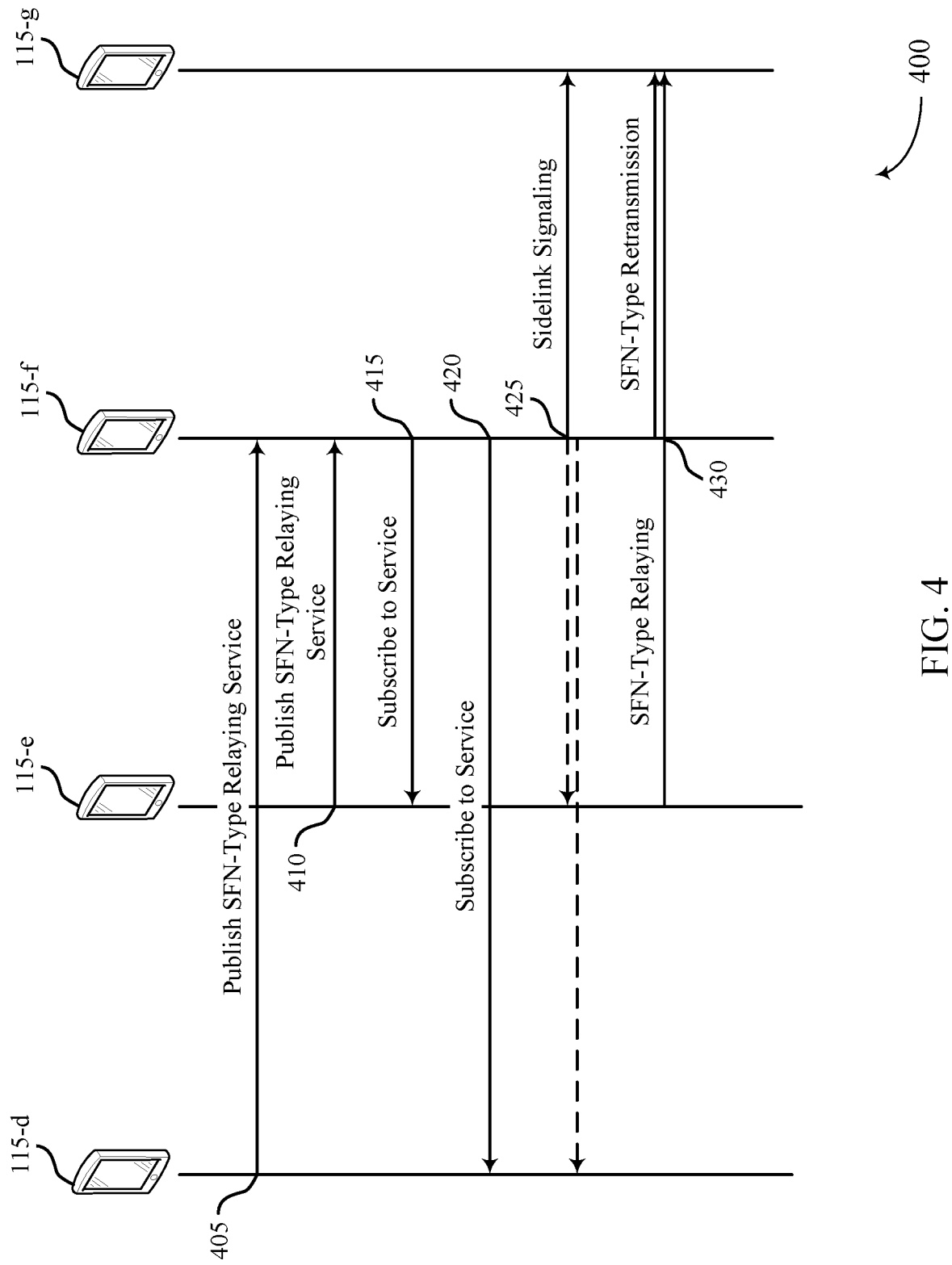
FIG. 4 illustrates an example of a process flow that supports SFN-manner relaying of sidelink signals in accordance with aspects of the present disclosure.

FIG. 4 illustrates an example of a process flow 400 that supports SFN-manner relaying of sidelink signals in accordance with aspects of the present disclosure. The process flow 400 may be implemented by one or more aspects of the wireless communications system 100 and the wireless communications system 200. For example, the process flow 400 may correspond to communications between a UE 115-*d*, a UE 115-*e*, a UE 115-*f*, and a UE 115-*g*, which may be examples of the UEs 115 as described with reference to FIGS. 1 through 3. It should be noted that, while examples are discussed below, any number of devices and device types may be used to accomplish techniques described herein. In the following description of the process flow 400, operations between the UEs 115 may occur in a different order or at different times than as shown. Additionally, any of the UEs 115 may operate as a source UE, a destination UE, or a helper UE (e.g., relay UE) for communications. Some operations may also be omitted from the process flow 400, and other operations may be added to the process flow 400.

The UE 115-*d* and the UE 115-*e* may support SFN-type relaying services. At 405, the UE 115-*d* may transmit first signaling indicating a capability of the UE 115-*d* to support an SFN-type relaying service. The UE 115-*d* may publish this service information using unicast signaling, broadcast signaling, groupcast signaling, or any other type of signaling. The first signaling may include additional information related to publishing parameters of the service. Other UEs 115 may receive the first signaling and determine that the UE 115-*d* may provide SFN-type relaying of sidelink signaling, for example, according to a publish-subscription model. At 410, the UE 115-*e* may similarly transmit signaling indicating a capability of the UE 115-*e* to support an SFN-type relaying service. In some cases, the parameters for the services provided by the UE 115-*d* and the UE 115-*e* may be different.

The UE 115-*f* may subscribe to one or more SFN-type relaying services in response to the published capabilities. For example, at 415, the UE 115-*f* may transmit signaling to the UE 115-*e* indicating that the UE 115-*f* is subscribing to the SFN-type relaying service at the UE 115-*e*. Additionally or alternatively, at 420, the UE 115-*f* may subscribe to the relaying service provided by the UE 115-*d*. In some cases, the UE 115-*f* may subscribe to one or more SFN-type relaying services as a source UE. For example, the subscription may configure the relay UEs 115 to relay sidelink signaling transmitted by the UE 115-*f* (e.g., signaling for which UE 115-*f* is the source). Alternatively, a UE 115 may subscribe to one or more SFN-type relaying services as a destination UE, where the subscription may configure the relay UEs 115 to relay sidelink signaling transmitted to the UE 115-*f* (e.g., signaling for which UE 115 is the destination). In some examples, the UE 115-*f* may subscribe to a service for a pre-configured amount of time. In some cases, the UE 115-*f* may receive signaling in response indicating whether the subscription was accepted. For example, a UE 115 supporting an SFN-type relaying service may accept or reject subscriptions based on one or more parameters (e.g., relaying availability, proximity, a quantity of subscribed UEs 115, or any other parameters).

After establishing one or more SFN-type relaying pre-agreements, at 425, the UE 115-*f* may transmit sidelink signaling. The sidelink signaling may indicate a destination UE 115-*g*. However, in some cases, the UE 115-*g* may fail to receive the sidelink signaling directly from the UE 115-*f* (e.g., due to interference, blocking, beam misalignment). However, the UE 115-*d*, the UE 115-*e*, or both may receive the sidelink signaling. The UE 115-*d*, the UE 115-*e*, or both may determine that the received sidelink signaling is associated with a UE 115 subscribed to a relaying service and may decode the sidelink signaling (e.g., even though the UE 115-*d* and the UE 115-*e* are not destination UEs for the sidelink signaling). The UE 115-*d*, the UE 115-*e*, or both may determine whether to relay the sidelink signaling in resources configured for SFN-transmission based on one or more parameters. For example, the UE 115-*f* may request one or more specific relay UEs 115 to relay the sidelink signaling, or a relay UE 115 may determine whether to relay the sidelink signaling based on the destination UE, UE positioning information, beam alignment information, resource availability, signaling priority, or any combination of these or other parameters. As illustrated in FIG. 4, the UE 115-*e* may determine to relay the sidelink signaling, while the UE 115-*d* may determine not to relay the sidelink signaling.

At 430, the UE 115-*e* may relay the sidelink signaling. For example, the UE 115-*e* may receive first sidelink signaling from the UE 115-*f* and may generate second sidelink signaling corresponding to the first sidelink signaling based on the UE 115-*f* subscribing to the SFN-type relaying service at the UE 115-*e*. The second sidelink signaling may include the same data as the first sidelink signaling. Additionally, the control information for the first sidelink signaling and the second sidelink signaling may be the same or may be slightly different (e.g., due to different UEs 115 transmitting the sidelink signaling). In some cases, the UE 115-*e* may indicate the UE 115-*f* as the source UE of the generated second sidelink signaling, even though the UE 115-*e* is transmitting the second sidelink signaling. The UE 115-*e* may transmit the second sidelink signaling in a resource configured for SFN-type transmission based on generating the second sidelink signaling and based on the UE 115-*f* subscribing to the SFN-type relaying service at the UE 115-*e*. In some case, at 430, the UE 115-*f* may retransmit the sidelink signaling with the relayed sidelink signaling (e.g., leveraging the SFN-type resources). Additionally or alternatively, other UEs 115 may relay the sidelink signaling in overlapping resources supporting SFN-type transmissions. The UE 115-*g* may successfully receive the sidelink signaling based on the relaying.

Figure 5:
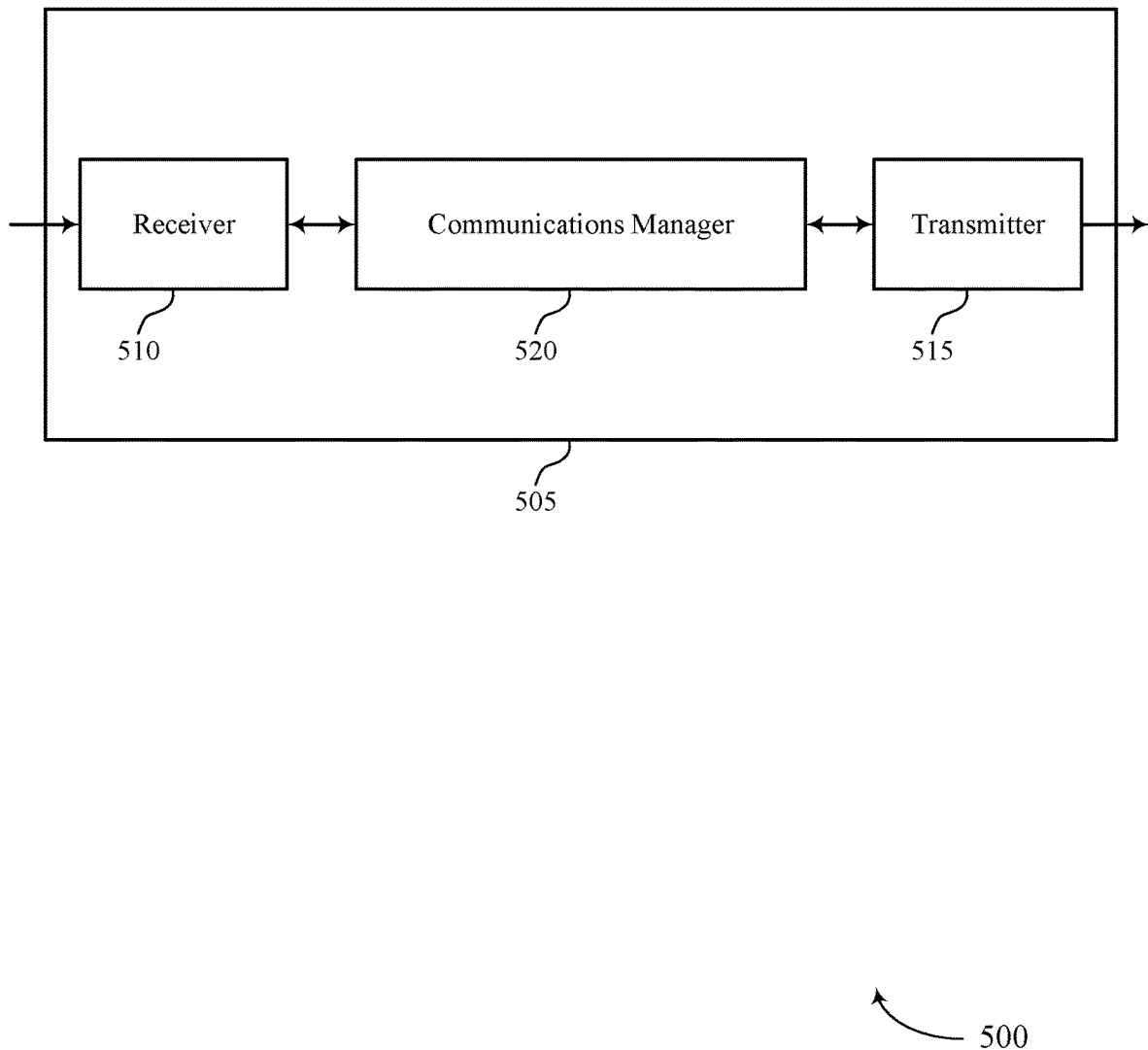
FIGS. 5 and 6 show block diagrams of devices that support SFN-manner relaying of sidelink signals in accordance with aspects of the present disclosure.

FIG. 5 shows a block diagram 500 of a device 505 that supports SFN-manner relaying of sidelink signals in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to SFN-manner relaying of sidelink signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SFN-manner relaying of sidelink signals). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of SFN-manner relaying of sidelink signals as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for receiving, from a second UE, first signaling indicating a capability of the second UE to support an SFN-type relaying service. The communications manager 520 may be configured as or otherwise support a means for transmitting, to the second UE, second signaling indicating that the first UE is subscribing to the SFN-type relaying service at the second UE. The communications manager 520 may be configured as or otherwise support a means for communicating sidelink signaling with a third UE via the second UE based on subscribing to the SFN-type relaying service at the second UE.

Additionally or alternatively, the communications manager 520 may support wireless communications at a second UE in accordance with examples as disclosed herein. For example, the communications manager 520 may be configured as or otherwise support a means for transmitting, to a first UE, first signaling indicating a capability of the second UE to support an SFN-type relaying service. The communications manager 520 may be configured as or otherwise support a means for receiving, from the first UE, second signaling indicating that the first UE is subscribing to the SFN-type relaying service at the second UE. The communications manager 520 may be configured as or otherwise support a means for receiving first sidelink signaling corresponding to the first UE and a third UE. The communications manager 520 may be configured as or otherwise support a means for generating second sidelink signaling corresponding to the first sidelink signaling based on the first UE subscribing to the SFN-type relaying service at the second UE. The communications manager 520 may be configured as or otherwise support a means for transmitting the second sidelink signaling in a resource configured for SFN-type transmission based on the generating and on the first UE subscribing to the SFN-type relaying service at the second UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of resources. For example, the device 505 may improve communication reliability of sidelink signaling based on supporting SFN-type relaying. Improving communication reliability may improve latency and may reduce the quantity of retransmissions, correspondingly reducing processing resources used for retransmissions. Additionally, based on using SFN-type transmissions, the device 505 may efficiently use the available resources by sharing resources with other devices transmitting the sidelink signaling (e.g., overlapping in the resources configured for SFN-type transmissions).

Figure 6:
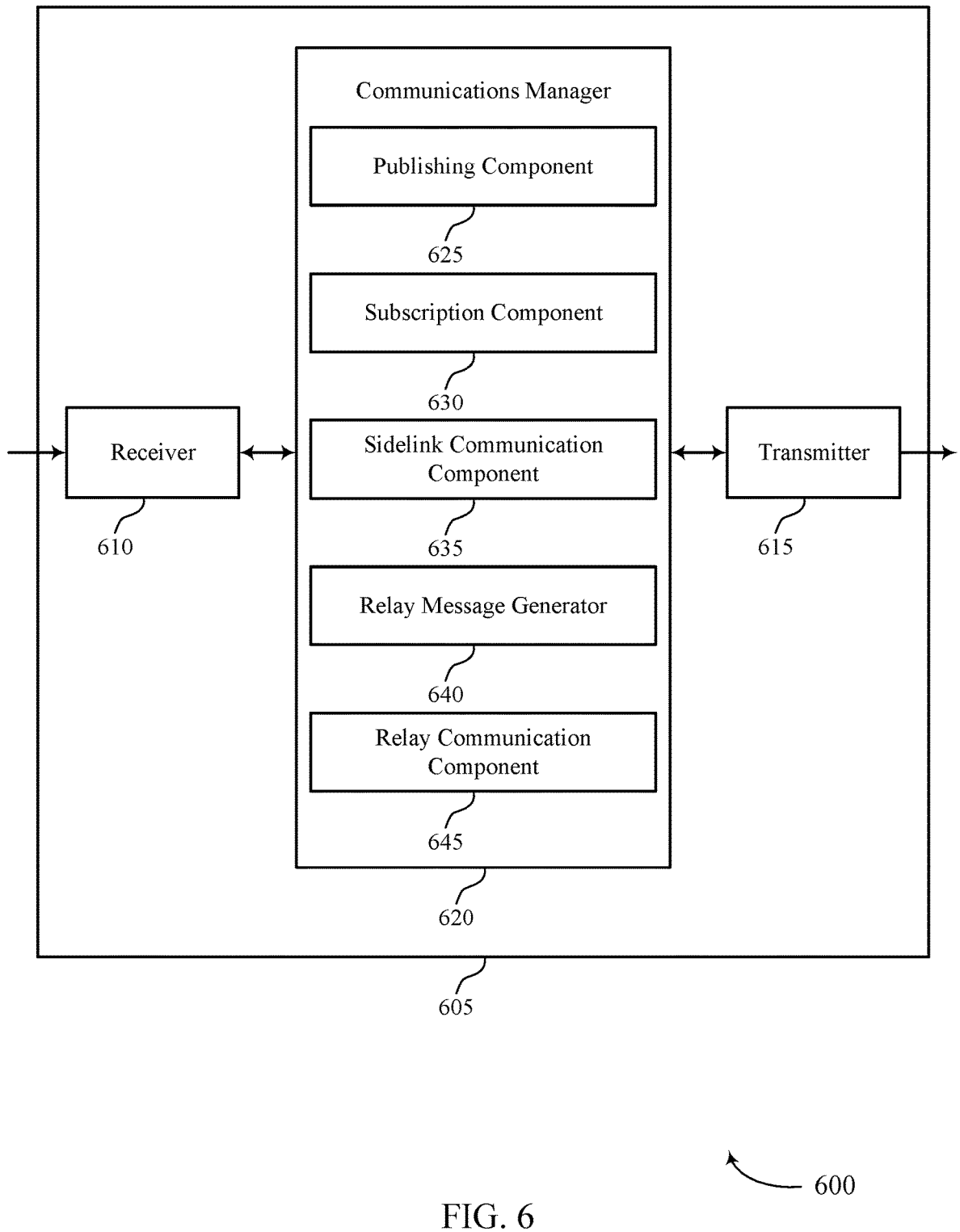

FIG. 6 shows a block diagram 600 of a device 605 that supports SFN-manner relaying of sidelink signals in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to SFN-manner relaying of sidelink signals). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SFN-manner relaying of sidelink signals). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of SFN-manner relaying of sidelink signals as described herein. For example, the communications manager 620 may include a publishing component 625, a subscription component 630, a sidelink communication component 635, a relay message generator 640, a relay communication component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The publishing component 625 may be configured as or otherwise support a means for receiving, from a second UE, first signaling indicating a capability of the second UE to support an SFN-type relaying service. The subscription component 630 may be configured as or otherwise support a means for transmitting, to the second UE, second signaling indicating that the first UE is subscribing to the SFN-type relaying service at the second UE. The sidelink communication component 635 may be configured as or otherwise support a means for communicating sidelink signaling with a third UE via the second UE based on subscribing to the SFN-type relaying service at the second UE.

Additionally or alternatively, the communications manager 620 may support wireless communications at a second UE in accordance with examples as disclosed herein. The publishing component 625 may be configured as or otherwise support a means for transmitting, to a first UE, first signaling indicating a capability of the second UE to support an SFN-type relaying service. The subscription component 630 may be configured as or otherwise support a means for receiving, from the first UE, second signaling indicating that the first UE is subscribing to the SFN-type relaying service at the second UE. The sidelink communication component 635 may be configured as or otherwise support a means for receiving first sidelink signaling corresponding to the first UE and a third UE. The relay message generator 640 may be configured as or otherwise support a means for generating second sidelink signaling corresponding to the first sidelink signaling based on the first UE subscribing to the SFN-type relaying service at the second UE. The relay communication component 645 may be configured as or otherwise support a means for transmitting the second sidelink signaling in a resource configured for SFN-type transmission based on the generating and on the first UE subscribing to the SFN-type relaying service at the second UE.

Figure 7:
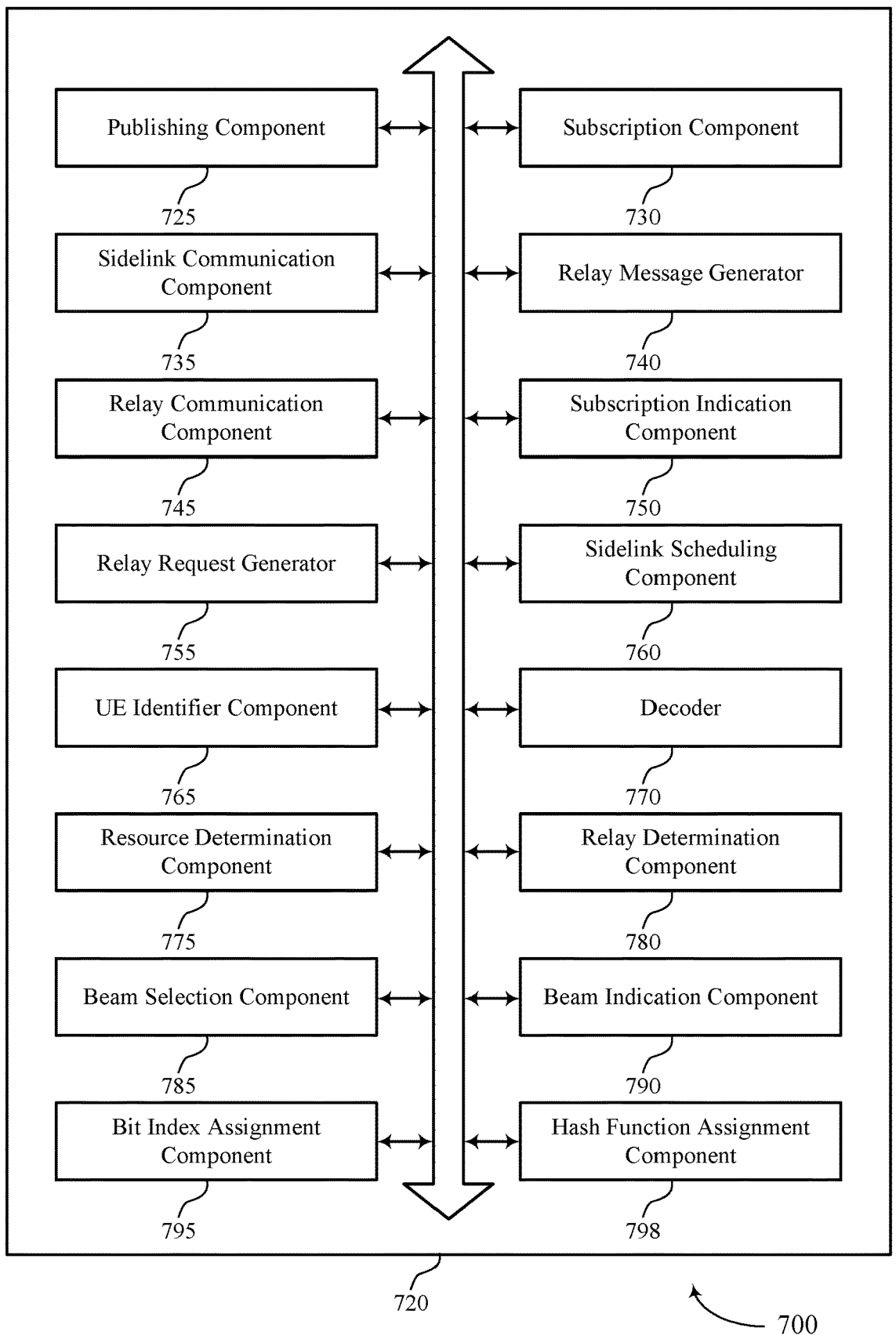
FIG. 7 shows a block diagram of a communications manager that supports SFN-manner relaying of sidelink signals in accordance with aspects of the present disclosure.

FIG. 7 shows a block diagram 700 of a communications manager 720 that supports SFN-manner relaying of sidelink signals in accordance with aspects of the present disclosure. The communications manager 720 may be an example of aspects of a communications manager 520, a communications manager 620, or both, as described herein. The communications manager 720, or various components thereof, may be an example of means for performing various aspects of SFN-manner relaying of sidelink signals as described herein. For example, the communications manager 720 may include a publishing component 725, a subscription component 730, a sidelink communication component 735, a relay message generator 740, a relay communication component 745, a subscription indication component 750, a relay request generator 755, a sidelink scheduling component 760, a UE identifier component 765, a decoder 770, a resource determination component 775, a relay determination component 780, a beam selection component 785, a beam indication component 790, a bit index assignment component 795, a hash function assignment component 798, or any combination thereof. Each of these components may communicate, directly or indirectly, with one another (e.g., via one or more buses).

The communications manager 720 may support wireless communications at a first UE in accordance with examples as disclosed herein. The publishing component 725 may be configured as or otherwise support a means for receiving, from a second UE, first signaling indicating a capability of the second UE to support an SFN-type relaying service. The subscription component 730 may be configured as or otherwise support a means for transmitting, to the second UE, second signaling indicating that the first UE is subscribing to the SFN-type relaying service at the second UE. The sidelink communication component 735 may be configured as or otherwise support a means for communicating sidelink signaling with a third UE via the second UE based on subscribing to the SFN-type relaying service at the second UE.

In some examples, to support communicating, the sidelink communication component 735 may be configured as or otherwise support a means for transmitting the sidelink signaling to a set of multiple UEs via the second UE based on subscribing to the SFN-type relaying service at the second UE, the set of multiple UEs including at least the third UE.

In some examples, the subscription indication component 750 may be configured as or otherwise support a means for transmitting, to the third UE, an indication that the first UE is subscribed to the SFN-type relaying service at the second UE. In some examples, to support communicating, the sidelink communication component 735 may be configured as or otherwise support a means for receiving the sidelink signaling from the third UE via the second UE further based on transmitting the indication to the third UE.

In some examples, the relay request generator 755 may be configured as or otherwise support a means for generating the sidelink signaling to include an indication of a request for the second UE to relay the sidelink signaling. In some examples, to support communicating, the sidelink communication component 735 may be configured as or otherwise support a means for transmitting the generated sidelink signaling to the third UE via the second UE further based on the request for the second UE to relay the sidelink signaling.

In some examples, the SFN-type relaying service at the second UE corresponds to a time resource, a frequency resource, or both supporting SFN-type relaying, and the sidelink scheduling component 760 may be configured as or otherwise support a means for scheduling the sidelink signaling for the time resource, the frequency resource, or both based on the SFN-type relaying service, where the sidelink signaling is communicated via the second UE based on scheduling the sidelink signaling for the time resource, the frequency resource, or both.

In some examples, the first signaling is received over an RRC layer, an application layer, a V2X interface layer, or a combination thereof, the second signaling is transmitted over the RRC layer, the application layer, the V2X interface layer, or a combination thereof, or both.

Additionally or alternatively, the communications manager 720 may support wireless communications at a second UE in accordance with examples as disclosed herein. In some examples, the publishing component 725 may be configured as or otherwise support a means for transmitting, to a first UE, first signaling indicating a capability of the second UE to support an SFN-type relaying service. In some examples, the subscription component 730 may be configured as or otherwise support a means for receiving, from the first UE, second signaling indicating that the first UE is subscribing to the SFN-type relaying service at the second UE. In some examples, the sidelink communication component 735 may be configured as or otherwise support a means for receiving first sidelink signaling corresponding to the first UE and a third UE. The relay message generator 740 may be configured as or otherwise support a means for generating second sidelink signaling corresponding to the first sidelink signaling based on the first UE subscribing to the SFN-type relaying service at the second UE. The relay communication component 745 may be configured as or otherwise support a means for transmitting the second sidelink signaling in a resource configured for SFN-type transmission based on the generating and on the first UE subscribing to the SFN-type relaying service at the second UE.

In some examples, the UE identifier component 765 may be configured as or otherwise support a means for determining an L2 identifier for the first UE associated with the first UE subscribing to the SFN-type relaying service at the second UE. In some examples, the decoder 770 may be configured as or otherwise support a means for decoding SCI for the first sidelink signaling, the SCI indicating an L1 identifier for the first UE. In some examples, the UE identifier component 765 may be configured as or otherwise support a means for comparing the L1 identifier for the first UE to a portion of the L2 identifier for the first UE, where generating the second sidelink signaling is further based on the comparing.

In some examples, the decoder 770 may be configured as or otherwise support a means for decoding data for the first sidelink signaling based on the comparing, the data indicating the L2 identifier for the first UE. In some examples, the UE identifier component 765 may be configured as or otherwise support a means for determining to transmit the second sidelink signaling based on the data indicating the L2 identifier for the first UE.

In some examples, the SCI indicates the L1 identifier for the first UE as a source identifier for the first sidelink signaling or a destination identifier for the first sidelink signaling.

In some examples, the resource determination component 775 may be configured as or otherwise support a means for determining the resource configured for the SFN-type transmission based on control information corresponding to the first sidelink signaling, where the second sidelink signaling is transmitted based on determining the resource.

In some examples, the relay determination component 780 may be configured as or otherwise support a means for determining to relay any sidelink signaling corresponding to the first UE based on a subscription by the first UE to the SFN-type relaying service at the second UE, where transmitting the second sidelink signaling is based on the determining.

In some examples, the relay determination component 780 may be configured as or otherwise support a means for determining to relay a subset of sidelink signaling corresponding to the first UE based on a set of one or more parameters associated with the subset of sidelink signaling and on a subscription by the first UE to the SFN-type relaying service at the second UE, where transmitting the second sidelink signaling is based on the first sidelink signaling being associated with the set of one or more parameters.

In some examples, the set of one or more parameters includes one or more cast types, one or more associated UEs, one or more beam indices, one or more zones, one or more priority levels, or a combination thereof.

In some examples, the relay determination component 780 may be configured as or otherwise support a means for determining to relay the first sidelink signaling based on the first sidelink signaling including a bit value indicating a request for on-demand relaying of the first sidelink signaling by the first UE, where transmitting the second sidelink signaling is based on the determining.

In some examples, the bit index assignment component 795 may be configured as or otherwise support a means for supporting a threshold quantity of UEs subscribing to the SFN-type relaying service at the second UE, where the first sidelink signaling includes a bit field indicating the bit value, and the bit field includes a quantity of bits equal to the threshold quantity of UEs supported for subscribing to the SFN-type relaying service. In some examples, the bit index assignment component 795 may be configured as or otherwise support a means for assigning a bit index to the first UE based on the first UE subscribing to the SFN-type relaying service at the second UE, where the bit value indicating the request for the on-demand relaying of the first sidelink signaling by the first UE is included in the quantity of bits of the bit field according to the assigned bit index.

In some examples, the hash function assignment component 798 may be configured as or otherwise support a means for assigning a hash function to the first UE based on the first UE subscribing to the SFN-type relaying service at the second UE, where determining to relay the first sidelink signaling is based on the bit value and the hash function assigned to the first UE.

In some examples, the first UE subscribes to the SFN-type relaying service at the second UE for a set of one or more transmit beams. In some such examples, to support transmitting the second sidelink signaling, the beam selection component 785 may be configured as or otherwise support a means for transmitting the second sidelink signaling using one or more transmit beams of the set of one or more transmit beams.

In some examples, the beam selection component 785 may be configured as or otherwise support a means for determining the one or more transmit beams, the set of one or more transmit beams, or both based on a destination identifier for the first sidelink signaling, a position of a destination UE for the first sidelink signaling, or both.

In some examples, the beam selection component 785 may be configured as or otherwise support a means for determining the one or more transmit beams, the set of one or more transmit beams, or both based on a pseudo-random selection from a superset of transmit beams supported by the first UE.

In some examples, the resource determination component 775 may be configured as or otherwise support a means for determining the resource configured for the SFN-type transmission based on a periodicity of resources supporting SFN-type transmissions.

In some examples, the beam indication component 790 may be configured as or otherwise support a means for indicating, to the first UE, one or more receive beams available for the SFN-type relaying service at the second UE, where the first sidelink signaling is received according to at least one receive beam of the one or more receive beams.

In some examples, the publishing component 725 may be configured as or otherwise support a means for transmitting, to a base station, the first signaling indicating the capability of the second UE to support the SFN-type relaying service.

In some examples, the subscription component 730 may be configured as or otherwise support a means for receiving, from the base station, third signaling indicating that the base station is subscribing to the SFN-type relaying service at the second UE.

In some examples, the base station subscribes to the SFN-type relaying service at the second UE for one or more zones, and the relay communication component 745 may be configured as or otherwise support a means for relaying fourth signaling between the base station and a fourth UE in a second resource configured for SFN-type transmission based on the base station being subscribed to the SFN-type relaying service at the second UE and on the fourth UE being located within the one or more zones.

In some examples, the first UE is subscribed to the SFN-type relaying service at the second UE for a time period, and the subscription component 730 may be configured as or otherwise support a means for unsubscribing the first UE from the SFN-type relaying service at the second UE based on an expiry of the time period.

In some examples, the first signaling is transmitted over an RRC layer, an application layer, a V2X interface layer, or a combination thereof, the second signaling is received over the RRC layer, the application layer, the V2X interface layer, or a combination thereof, or both.

Figure 8:
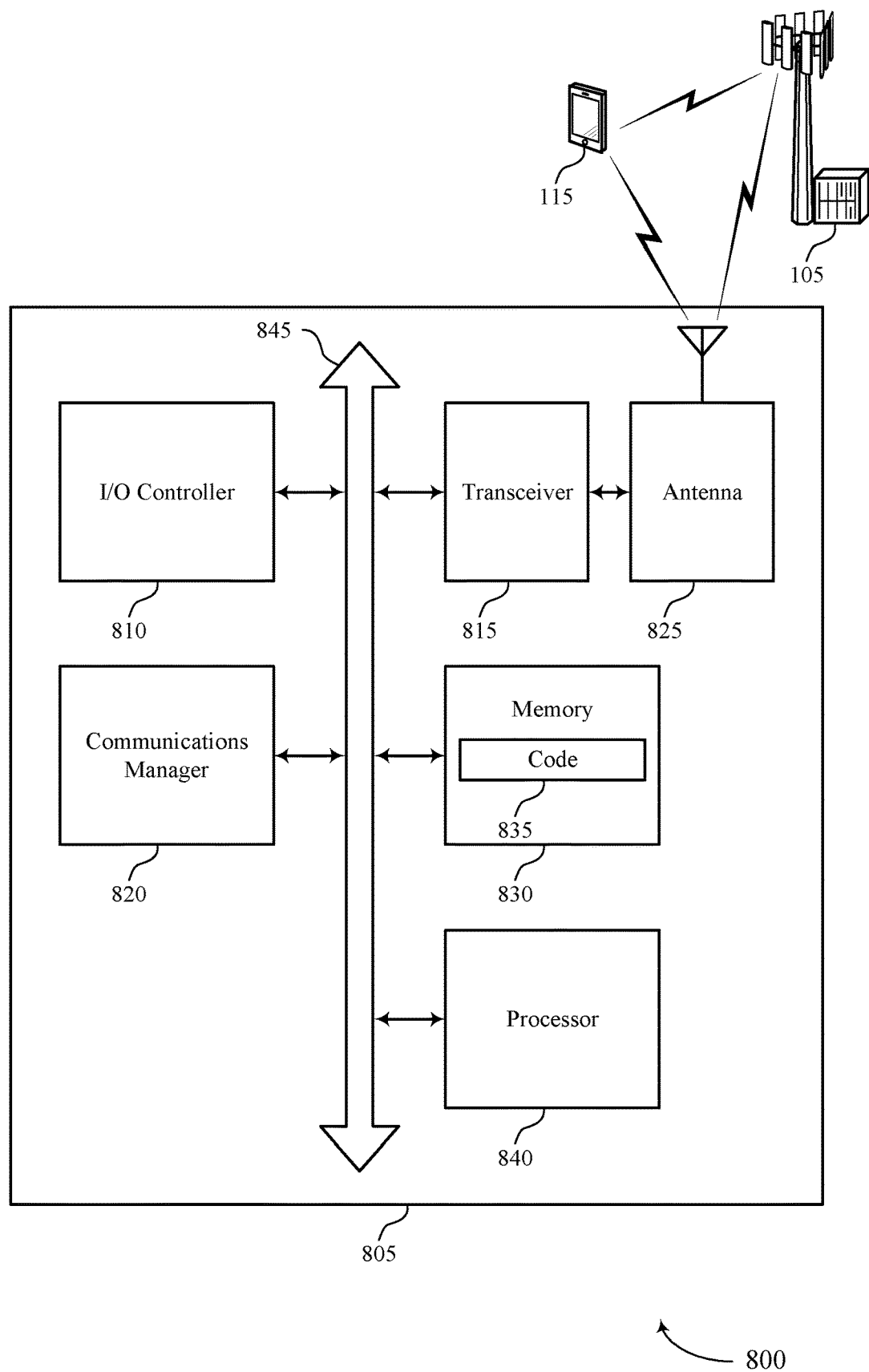
FIG. 8 shows a diagram of a system including a device that supports SFN-manner relaying of sidelink signals in accordance with aspects of the present disclosure.

FIG. 8 shows a diagram of a system 800 including a device 805 that supports SFN-manner relaying of sidelink signals in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting SFN-manner relaying of sidelink signals). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for receiving, from a second UE, first signaling indicating a capability of the second UE to support an SFN-type relaying service. The communications manager 820 may be configured as or otherwise support a means for transmitting, to the second UE, second signaling indicating that the first UE is subscribing to the SFN-type relaying service at the second UE. The communications manager 820 may be configured as or otherwise support a means for communicating sidelink signaling with a third UE via the second UE based on subscribing to the SFN-type relaying service at the second UE.

Additionally or alternatively, the communications manager 820 may support wireless communications at a second UE in accordance with examples as disclosed herein. For example, the communications manager 820 may be configured as or otherwise support a means for transmitting, to a first UE, first signaling indicating a capability of the second UE to support an SFN-type relaying service. The communications manager 820 may be configured as or otherwise support a means for receiving, from the first UE, second signaling indicating that the first UE is subscribing to the SFN-type relaying service at the second UE. The communications manager 820 may be configured as or otherwise support a means for receiving first sidelink signaling corresponding to the first UE and a third UE. The communications manager 820 may be configured as or otherwise support a means for generating second sidelink signaling corresponding to the first sidelink signaling based on the first UE subscribing to the SFN-type relaying service at the second UE. The communications manager 820 may be configured as or otherwise support a means for transmitting the second sidelink signaling in a resource configured for SFN-type transmission based on the generating and on the first UE subscribing to the SFN-type relaying service at the second UE.

By including or configuring the communications manager 820 in accordance with examples as described herein, the device 805 may support techniques for improved communication reliability, reduced latency, improved coordination between devices, and longer battery life by utilizing SFN-manner transmissions to relay information to destination UEs.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of SFN-manner relaying of sidelink signals as described herein, or the processor 840 and the memory 830 may be otherwise configured to perform or support such operations.

Figure 9:
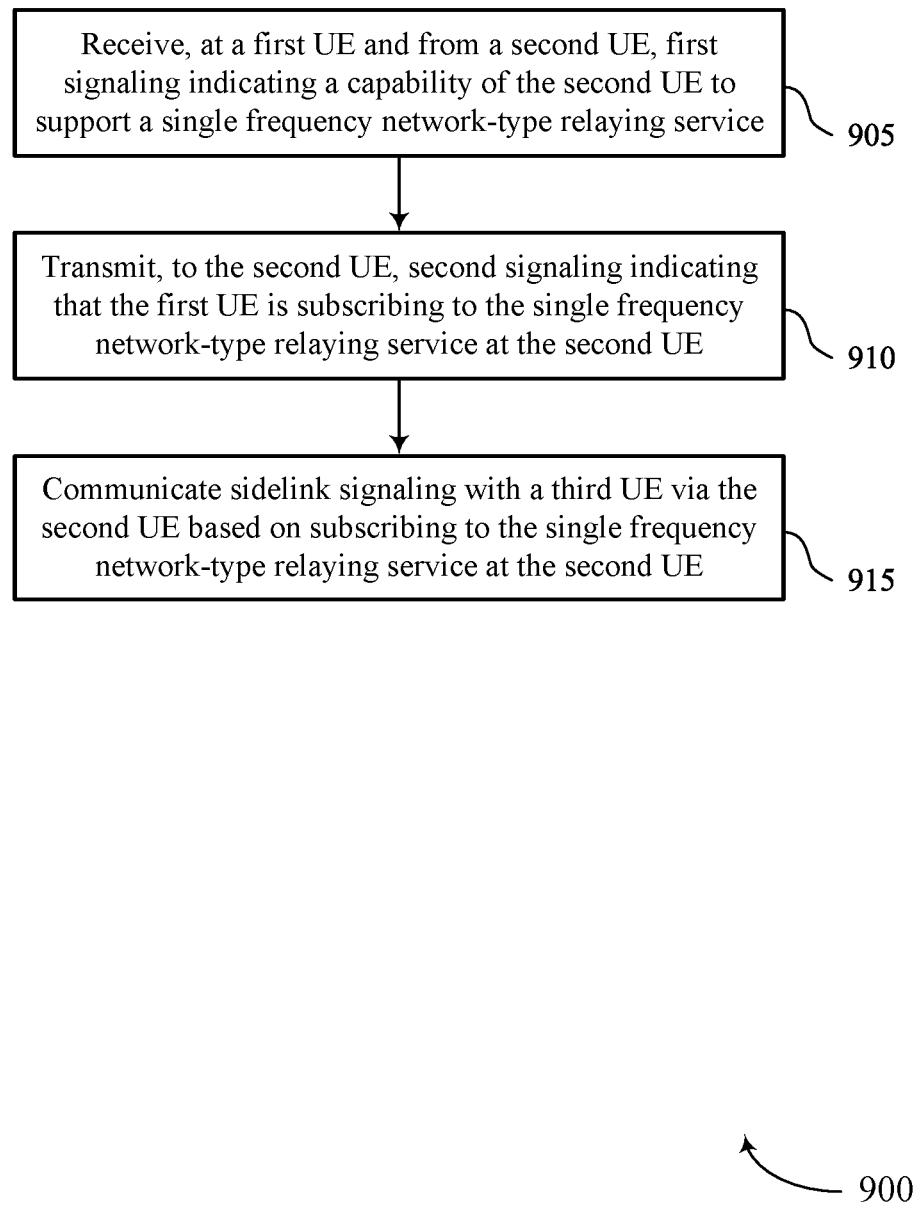
FIGS. 9 through 11 show flowcharts illustrating methods that support SFN-manner relaying of sidelink signals in accordance with aspects of the present disclosure.

FIG. 9 shows a flowchart illustrating a method 900 that supports SFN-manner relaying of sidelink signals in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, at a first UE and from a second UE, first signaling indicating a capability of the second UE to support an SFN-type relaying service. The operations of 905 may be performed in accordance with examples as disclosed herein. In some examples, aspects of the operations of 905 may be performed by a publishing component 725 as described with reference to FIG. 7.

At 910, the method may include transmitting, to the second UE, second signaling indicating that the first UE is subscribing to the SFN-type relaying service at the second UE. The operations of 910 may be performed in accordance with examples as disclosed herein. In some examples, aspects of the operations of 910 may be performed by a subscription component 730 as described with reference to FIG. 7.

At 915, the method may include communicating sidelink signaling with a third UE via the second UE based on subscribing to the SFN-type relaying service at the second UE. The operations of 915 may be performed in accordance with examples as disclosed herein. In some examples, aspects of the operations of 915 may be performed by a sidelink communication component 735 as described with reference to FIG. 7.

Figure 10:
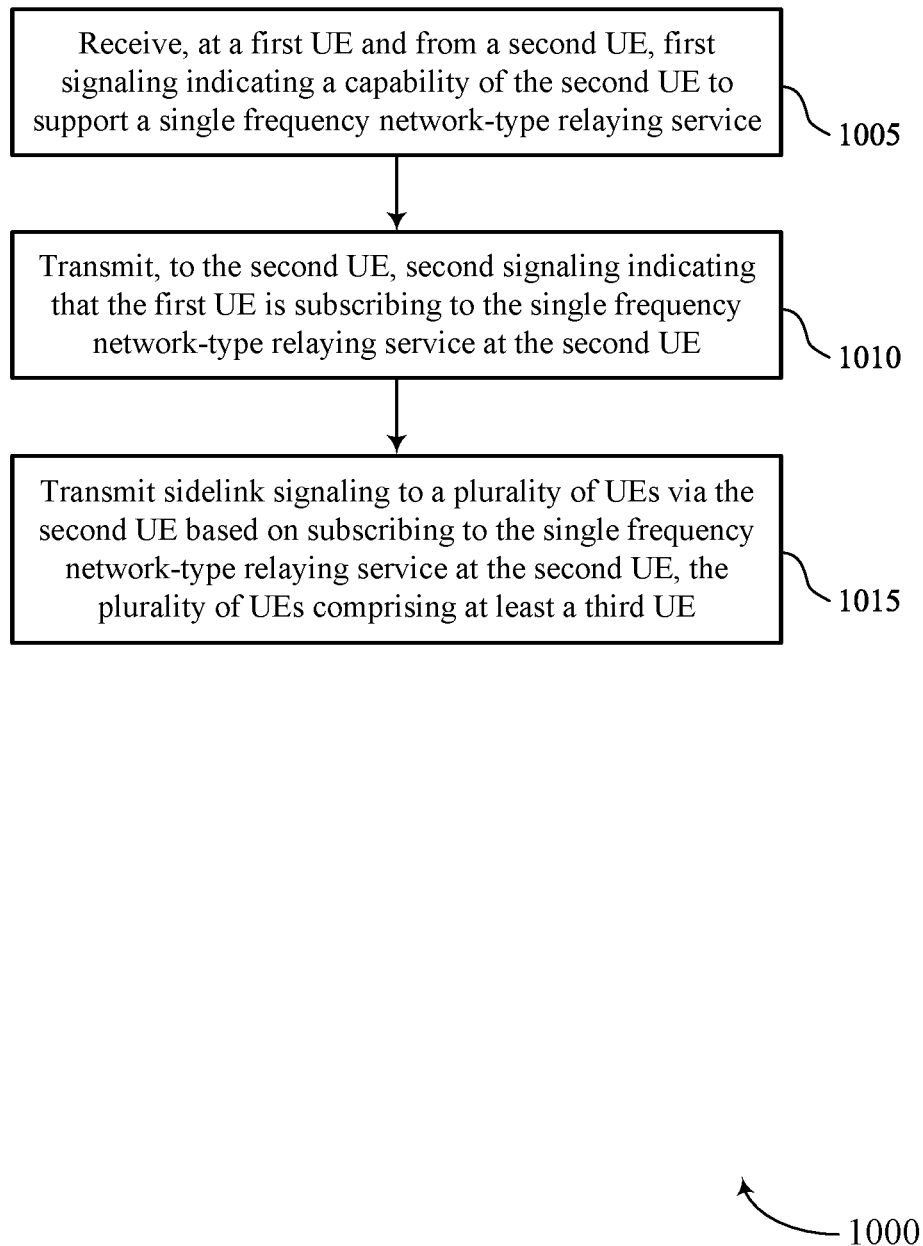

FIG. 10 shows a flowchart illustrating a method 1000 that supports SFN-manner relaying of sidelink signals in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, at a first UE and from a second UE, first signaling indicating a capability of the second UE to support an SFN-type relaying service. The operations of 1005 may be performed in accordance with examples as disclosed herein. In some examples, aspects of the operations of 1005 may be performed by a publishing component 725 as described with reference to FIG. 7.

At 1010, the method may include transmitting, to the second UE, second signaling indicating that the first UE is subscribing to the SFN-type relaying service at the second UE. The operations of 1010 may be performed in accordance with examples as disclosed herein. In some examples, aspects of the operations of 1010 may be performed by a subscription component 730 as described with reference to FIG. 7.

At 1015, the method may include transmitting sidelink signaling to a set of multiple UEs via the second UE based on subscribing to the SFN-type relaying service at the second UE, the set of multiple UEs including at least a third UE. The operations of 1015 may be performed in accordance with examples as disclosed herein. In some examples, aspects of the operations of 1015 may be performed by a sidelink communication component 735 as described with reference to FIG. 7.

Figure 11:
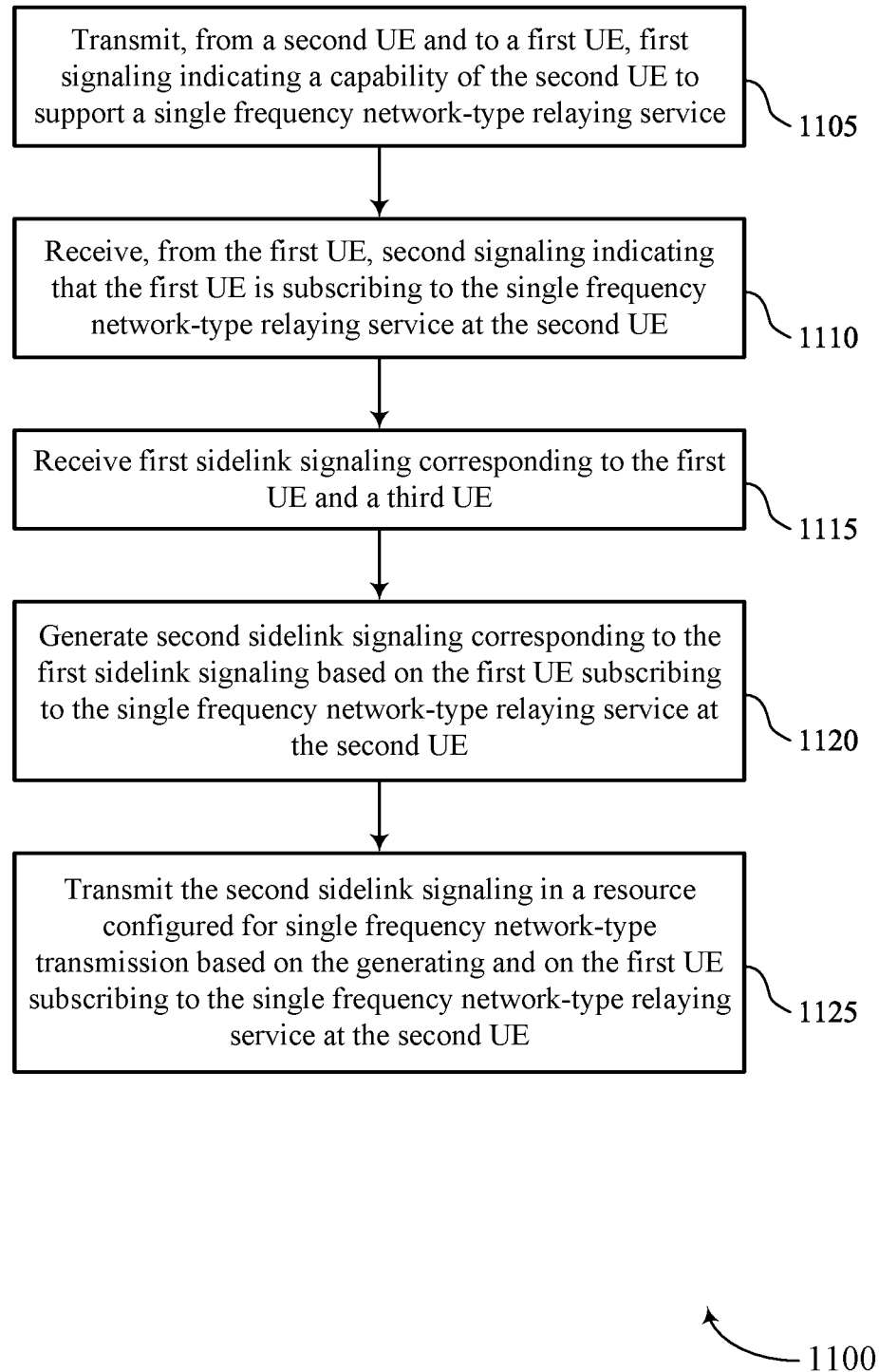

FIG. 11 shows a flowchart illustrating a method 1100 that supports SFN-manner relaying of sidelink signals in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting, from a second UE and to a first UE, first signaling indicating a capability of the second UE to support an SFN-type relaying service. The operations of 1105 may be performed in accordance with examples as disclosed herein. In some examples, aspects of the operations of 1105 may be performed by a publishing component 725 as described with reference to FIG. 7.

At 1110, the method may include receiving, from the first UE, second signaling indicating that the first UE is subscribing to the SFN-type relaying service at the second UE. The operations of 1110 may be performed in accordance with examples as disclosed herein. In some examples, aspects of the operations of 1110 may be performed by a subscription component 730 as described with reference to FIG. 7.

At 1115, the method may include receiving first sidelink signaling corresponding to the first UE and a third UE. The operations of 1115 may be performed in accordance with examples as disclosed herein. In some examples, aspects of the operations of 1115 may be performed by a sidelink communication component 735 as described with reference to FIG. 7.

At 1120, the method may include generating second sidelink signaling corresponding to the first sidelink signaling based on the first UE subscribing to the SFN-type relaying service at the second UE. The operations of 1120 may be performed in accordance with examples as disclosed herein. In some examples, aspects of the operations of 1120 may be performed by a relay message generator 740 as described with reference to FIG. 7.

At 1125, the method may include transmitting the second sidelink signaling in a resource configured for SFN-type transmission based on the generating and on the first UE subscribing to the SFN-type relaying service at the second UE. The operations of 1125 may be performed in accordance with examples as disclosed herein. In some examples, aspects of the operations of 1125 may be performed by a relay communication component 745 as described with reference to FIG. 7.

The following provides an overview of aspects of the present disclosure:

Aspect 1: A method for wireless communications at a first UE, comprising: receiving, from a second UE, first signaling indicating a capability of the second UE to support a single frequency network-type relaying service; transmitting, to the second UE, second signaling indicating that the first UE is subscribing to the single frequency network-type relaying service at the second UE; and communicating sidelink signaling with a third UE via the second UE based at least in part on subscribing to the single frequency network-type relaying service at the second UE.

Aspect 2: The method of aspect 1, wherein the communicating comprises: transmitting the sidelink signaling to a plurality of UEs via the second UE based at least in part on subscribing to the single frequency network-type relaying service at the second UE, the plurality of UEs comprising at least the third UE.

Aspect 3: The method of aspect 1, further comprising: transmitting, to the third UE, an indication that the first UE is subscribed to the single frequency network-type relaying service at the second UE, wherein the communicating comprises: receiving the sidelink signaling from the third UE via the second UE further based at least in part on transmitting the indication to the third UE.

Aspect 4: The method of any of aspects 1 through 2, further comprising: generating the sidelink signaling to comprise an indication of a request for the second UE to relay the sidelink signaling, wherein the communicating comprises: transmitting the generated sidelink signaling to the third UE via the second UE further based at least in part on the request for the second UE to relay the sidelink signaling.

Aspect 5: The method of any of aspects 1 through 2 and 4, wherein the single frequency network-type relaying service at the second UE corresponds to a time resource, a frequency resource, or both supporting single frequency network-type relaying, the method further comprising: scheduling the sidelink signaling for the time resource, the frequency resource, or both based at least in part on the single frequency network-type relaying service, wherein the sidelink signaling is communicated via the second UE based at least in part on scheduling the sidelink signaling for the time resource, the frequency resource, or both.

Aspect 6: The method of any of aspects 1 through 5, wherein the first signaling is received over a radio resource control layer, an application layer, a vehicle-to-everything interface layer, or a combination thereof, the second signaling is transmitted over the radio resource control layer, the application layer, the vehicle-to-everything interface layer, or a combination thereof, or both.

Aspect 7: A method for wireless communications at a second UE, comprising: transmitting, to a first UE, first signaling indicating a capability of the second UE to support a single frequency network-type relaying service; receiving, from the first UE, second signaling indicating that the first UE is subscribing to the single frequency network-type relaying service at the second UE; receiving first sidelink signaling corresponding to the first UE and a third UE; generating second sidelink signaling corresponding to the first sidelink signaling based at least in part on the first UE subscribing to the single frequency network-type relaying service at the second UE; and transmitting the second sidelink signaling in a resource configured for single frequency network-type transmission based at least in part on the generating and on the first UE subscribing to the single frequency network-type relaying service at the second UE.

Aspect 8: The method of aspect 7, further comprising: determining a layer 2 identifier for the first UE associated with the first UE subscribing to the single frequency network-type relaying service at the second UE; decoding sidelink control information for the first sidelink signaling, the sidelink control information indicating a layer 1 identifier for the first UE; and comparing the layer 1 identifier for the first UE to a portion of the layer 2 identifier for the first UE, wherein generating the second sidelink signaling is further based at least in part on the comparing.

Aspect 9: The method of aspect 8, further comprising: decoding data for the first sidelink signaling based at least in part on the comparing, the data indicating the layer 2 identifier for the first UE; and determining to transmit the second sidelink signaling based at least in part on the data indicating the layer 2 identifier for the first UE.

Aspect 10: The method of any of aspects 8 through 9, wherein the sidelink control information indicates the layer 1 identifier for the first UE as a source identifier for the first sidelink signaling or a destination identifier for the first sidelink signaling.

Aspect 11: The method of any of aspects 7 through 10, further comprising: determining the resource configured for the single frequency network-type transmission based at least in part on control information corresponding to the first sidelink signaling, wherein the second sidelink signaling is transmitted based at least in part on determining the resource.

Aspect 12: The method of any of aspects 7 through 11, further comprising: determining to relay any sidelink signaling corresponding to the first UE based at least in part on a subscription by the first UE to the single frequency network-type relaying service at the second UE, wherein transmitting the second sidelink signaling is based at least in part on the determining.

Aspect 13: The method of any of aspects 7 through 11, further comprising: determining to relay a subset of sidelink signaling corresponding to the first UE based at least in part on a set of one or more parameters associated with the subset of sidelink signaling and on a subscription by the first UE to the single frequency network-type relaying service at the second UE, wherein transmitting the second sidelink signaling is based at least in part on the first sidelink signaling being associated with the set of one or more parameters.

Aspect 14: The method of aspect 13, wherein the set of one or more parameters comprises one or more cast types, one or more associated UEs, one or more beam indices, one or more zones, one or more priority levels, or a combination thereof.

Aspect 15: The method of any of aspects 7 through 14, further comprising: determining to relay the first sidelink signaling based at least in part on the first sidelink signaling comprising a bit value indicating a request for on-demand relaying of the first sidelink signaling by the first UE, wherein transmitting the second sidelink signaling is based at least in part on the determining.

Aspect 16: The method of aspect 15, further comprising: supporting a threshold quantity of UEs subscribing to the single frequency network-type relaying service at the second UE, wherein the first sidelink signaling comprises a bit field indicating the bit value, and the bit field comprises a quantity of bits equal to the threshold quantity of UEs supported for subscribing to the single frequency network-type relaying service; and assigning a bit index to the first UE based at least in part on the first UE subscribing to the single frequency network-type relaying service at the second UE, wherein the bit value indicating the request for the on-demand relaying of the first sidelink signaling by the first UE is included in the quantity of bits of the bit field according to the assigned bit index.

Aspect 17: The method of aspect 15, further comprising: assigning a hash function to the first UE based at least in part on the first UE subscribing to the single frequency network-type relaying service at the second UE, wherein determining to relay the first sidelink signaling is based at least in part on the bit value and the hash function assigned to the first UE.

Aspect 18: The method of any of aspects 7 through 17, wherein the first UE subscribes to the single frequency network-type relaying service at the second UE for a set of one or more transmit beams, and wherein transmitting the second sidelink signaling further comprises: transmitting the second sidelink signaling using one or more transmit beams of the set of one or more transmit beams.

Aspect 19: The method of aspect 18, further comprising: determining the one or more transmit beams, the set of one or more transmit beams, or both based at least in part on a destination identifier for the first sidelink signaling, a position of a destination UE for the first sidelink signaling, or both.

Aspect 20: The method of aspect 18, further comprising: determining the one or more transmit beams, the set of one or more transmit beams, or both based at least in part on a pseudo-random selection from a superset of transmit beams supported by the first UE.

Aspect 21: The method of any of aspects 7 through 20, further comprising: determining the resource configured for the single frequency network-type transmission based at least in part on a periodicity of resources supporting single frequency network-type transmissions.

Aspect 22: The method of any of aspects 7 through 21, further comprising: indicating, to the first UE, one or more receive beams available for the single frequency network-type relaying service at the second UE, wherein the first sidelink signaling is received according to at least one receive beam of the one or more receive beams.

Aspect 23: The method of any of aspects 7 through 22, further comprising: transmitting, to a base station, the first signaling indicating the capability of the second UE to support the single frequency network-type relaying service;

and receiving, from the base station, third signaling indicating that the base station is subscribing to the single frequency network-type relaying service at the second UE.

Aspect 24: The method of aspect 23, wherein the base station subscribes to the single frequency network-type relaying service at the second UE for one or more zones, the method further comprising: relaying fourth signaling between the base station and a fourth UE in a second resource configured for single frequency network-type transmission based at least in part on the base station being subscribed to the single frequency network-type relaying service at the second UE and on the fourth UE being located within the one or more zones.

Aspect 25: The method of any of aspects 7 through 24, wherein the first UE is subscribed to the single frequency network-type relaying service at the second UE for a time period, the method further comprising: unsubscribing the first UE from the single frequency network-type relaying service at the second UE based at least in part on an expiry of the time period.

Aspect 26: The method of any of aspects 7 through 25, wherein the first signaling is transmitted over a radio resource control layer, an application layer, a vehicle-to-everything interface layer, or a combination thereof, the second signaling is received over the radio resource control layer, the application layer, the vehicle-to-everything interface layer, or a combination thereof, or both.

Aspect 27: An apparatus for wireless communications at a first UE, comprising a processor; memory coupled with the processor; and instructions stored in the memory and executable by the processor to cause the apparatus to perform a method of any of aspects 1 through 6.

Aspect 28: An apparatus for wireless communications at a first UE, comprising at least one means for performing a method of any of aspects 1 through 6.

Aspect 29: A non-transitory computer-readable medium storing code for wireless communications at a first UE, the code comprising instructions executable by a processor to perform a method of any of aspects 1 through 6.

Aspect 30: An apparatus for wireless communications at a second UE, comprising a processor; memory coupled with the processor; and instructions stored in the memory and executable by the processor to cause the apparatus to perform a method of any of aspects 7 through 26.

Aspect 31: An apparatus for wireless communications at a second UE, comprising at least one means for performing a method of any of aspects 7 through 26.

Aspect 32: A non-transitory computer-readable medium storing code for wireless communications at a second UE, the code comprising instructions executable by a processor to perform a method of any of aspects 7 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a second user equipment (UE), comprising:
    one or more processors;
    memory coupled with the one or more processors; and
    instructions stored in the memory and executable by the one or more processors to cause the apparatus to:
        transmit, for a first UE, first signaling publishing a capability of the second UE to support a single frequency network-type relaying service;
        receive, for the first UE, second signaling indicating that the first UE is subscribing to the single frequency network-type relaying service at the second UE;
        receive first sidelink signaling corresponding to the first UE and a third UE;
        generate second sidelink signaling corresponding to the first sidelink signaling based at least in part on the first UE subscribing to the single frequency network-type relaying service at the second UE; and
        transmit the second sidelink signaling via a resource configured for single frequency network-type transmission based at least in part on the generating and on the first UE subscribing to the single frequency network-type relaying service at the second UE.

2. The apparatus of claim 1, wherein the instructions are further executable by the one or more processors to cause the apparatus to:
    decode sidelink control information for the first sidelink signaling, the sidelink control information indicating a layer 1 identifier for the first UE; and
    compare the layer 1 identifier for the first UE to a portion of a layer 2 identifier for the first UE, the layer 2 identifier for the first UE associated with the first UE subscribing to the single frequency network-type relaying service at the second UE, wherein generating the second sidelink signaling is further based at least in part on the comparing.

3. The apparatus of claim 2, wherein the instructions are further executable by the one or more processors to cause the apparatus to:
    decode data for the first sidelink signaling based at least in part on the comparing, the data indicating the layer 2 identifier for the first UE, wherein the second sidelink signaling is transmitted based at least in part on the data indicating the layer 2 identifier for the first UE.

4. The apparatus of claim 2, wherein the sidelink control information indicates the layer 1 identifier for the first UE as a source identifier for the first sidelink signaling or a destination identifier for the first sidelink signaling.

5. The apparatus of claim 1, wherein the second sidelink signaling is transmitted via determining the resource configured for the single frequency network-type transmission based at least in part on control information corresponding to the first sidelink signaling.

6. The apparatus of claim 1, wherein the second sidelink signaling is transmitted based at least in part on a subscription by the first UE to the single frequency network-type relaying service at the second UE indicating for the second UE to relay any sidelink signaling corresponding to the first UE.

7. The apparatus of claim 1, wherein the second sidelink signaling is transmitted based at least in part on a set of parameters associated with a subset of sidelink signaling corresponding to the first UE and on a subscription by the first UE to the single frequency network-type relaying service at the second UE indicating for the second UE to relay the subset of sidelink signaling.

8. The apparatus of claim 7, wherein the set of parameters comprises one or more cast types, one or more associated UEs, one or more beam indices, one or more zones, one or more priority levels, or a combination thereof.

9. The apparatus of claim 1, wherein the second sidelink signaling is transmitted based at least in part on the first sidelink signaling comprising a bit value indicating a request for on-demand relaying of the first sidelink signaling by the first UE.

10. The apparatus of claim 9, wherein the instructions are further executable by the one or more processors to cause the apparatus to:
support a threshold quantity of UEs subscribing to the single frequency network-type relaying service at the second UE, wherein the first sidelink signaling comprises a bit field indicating the bit value, and the bit field comprises a quantity of bits equal to the threshold quantity of UEs supported for subscribing to the single frequency network-type relaying service; and
assign a bit index to the first UE based at least in part on the first UE subscribing to the single frequency network-type relaying service at the second UE, wherein the bit value indicating the request for the on-demand relaying of the first sidelink signaling by the first UE is included in the quantity of bits of the bit field according to the assigned bit index.

11. The apparatus of claim 9, wherein the instructions are further executable by the one or more processors to cause the apparatus to:
assign a hash function to the first UE based at least in part on the first UE subscribing to the single frequency network-type relaying service at the second UE, wherein the request for the on-demand relaying of the first sidelink signaling by the first UE is based at least in part on the bit value and the hash function assigned to the first UE.

12. The apparatus of claim 1, wherein the first UE subscribes to the single frequency network-type relaying service at the second UE for a set of transmit beams, and wherein the instructions executable by the one or more processors to cause the apparatus to transmit the second sidelink signaling are further executable by the one or more processors to cause the apparatus to:
transmit the second sidelink signaling using one or more transmit beams of the set of transmit beams.

13. The apparatus of claim 12, wherein the one or more transmit beams, the set of transmit beams, or both are based at least in part on a destination identifier for the first sidelink signaling, a position of a destination UE for the first sidelink signaling, or both.

14. The apparatus of claim 12, wherein the one or more transmit beams, the set of transmit beams, or both are based at least in part on a pseudo-random selection from a superset of transmit beams supported by the first UE.

15. The apparatus of claim 1, wherein the resource configured for the single frequency network-type transmission is based at least in part on a periodicity of resources supporting single frequency network-type transmissions.

16. The apparatus of claim 1, wherein the instructions are further executable by the one or more processors to cause the apparatus to:
transmit, for a network device, the first signaling publishing the capability of the second UE to support the single frequency network-type relaying service; and
receive, for the network device, third signaling indicating that the network device is subscribing to the single frequency network-type relaying service at the second UE.

17. The apparatus of claim 16, wherein the network device subscribes to the single frequency network-type relaying service at the second UE for one or more zones, and the instructions are further executable by the one or more processors to cause the apparatus to:
relay fourth signaling between the network device and a fourth UE in a second resource configured for the single frequency network-type transmission based at least in part on the network device being subscribed to the single frequency network-type relaying service at the second UE and on the fourth UE being located within the one or more zones.

18. The apparatus of claim 1, wherein the instructions are further executable by the one or more processors to cause the apparatus to:
indicate, to the first UE, one or more receive beams available for the single frequency network-type relaying service at the second UE, wherein the first sidelink signaling is received according to at least one receive beam of the one or more receive beams.

19. The apparatus of claim 1, wherein the first UE is subscribed to the single frequency network-type relaying service at the second UE for a time period, and the instructions are further executable by the one or more processors to cause the apparatus to:
unsubscribe the first UE from the single frequency network-type relaying service at the second UE based at least in part on an expiry of the time period.

20. The apparatus of claim 1, wherein the first signaling is transmitted via a radio resource control layer, an application layer, a vehicle-to-everything interface layer, or a combination thereof, the second signaling is received via the radio resource control layer, the application layer, the vehicle-to-everything interface layer, or a combination thereof, or both.

21. A method for wireless communications at a second user equipment (UE), comprising:
transmitting, for a first UE, first signaling indicating a capability of the second UE to support a single frequency network-type relaying service;
receiving, for the first UE, second signaling indicating that the first UE is subscribing to the single frequency network-type relaying service at the second UE;
receiving first sidelink signaling corresponding to the first UE and a third UE;
generating second sidelink signaling corresponding to the first sidelink signaling based at least in part on the first UE subscribing to the single frequency network-type relaying service at the second UE; and
transmitting the second sidelink signaling via a resource configured for single frequency network-type transmission based at least in part on the generating and on the first UE subscribing to the single frequency network-type relaying service at the second UE.

22. The method of claim 21, further comprising:
decoding sidelink control information for the first sidelink signaling, the sidelink control information indicating a layer 1 identifier for the first UE; and
comparing the layer 1 identifier for the first UE to a portion of a layer 2 identifier for the first UE, the layer 2 identifier for the first UE associated with the first UE subscribing to the single frequency network-type relaying service at the second UE, wherein generating the second sidelink signaling is further based at least in part on the comparing.

23. The method of claim 22, further comprising:
decoding data for the first sidelink signaling based at least in part on the comparing, the data indicating the layer 2 identifier for the first UE, wherein the second sidelink signaling is transmitted based at least in part on the data indicating the layer 2 identifier for the first UE.

24. The method of claim 21, wherein the second sidelink signaling is transmitted via the resource configured for the single frequency network-type transmission based at least in part on control information corresponding to the first sidelink signaling.

25. The method of claim 21, wherein the second sidelink signaling is transmitted based at least in part on a subscription by the first UE to the single frequency network-type relaying service at the second UE indicating for the second UE to relay any sidelink signaling corresponding to the first UE.

26. The method of claim 21, wherein the second sidelink signaling is transmitted based at least in part on a set of parameters associated with a subset of sidelink signaling corresponding to the first UE and on a subscription by the first UE to the single frequency network-type relaying service at the second UE indicating for the second UE to relay the subset of sidelink signaling.

27. The method of claim 26, wherein the set of parameters comprises one or more cast types, one or more associated UEs, one or more beam indices, one or more zones, one or more priority levels, or a combination thereof.

28. The method of claim 21, wherein the second sidelink signaling is transmitted based at least in part on the first sidelink signaling comprising a bit value indicating a request for on-demand relaying of the first sidelink signaling by the first UE.

29. An apparatus for wireless communications at a second user equipment (UE), comprising:
  means for transmitting, for a first UE, first signaling indicating a capability of the second UE to support a single frequency network-type relaying service;
  means for receiving, for the first UE, second signaling indicating that the first UE is subscribing to the single frequency network-type relaying service at the second UE;
  means for receiving first sidelink signaling corresponding to the first UE and a third UE;
  means for generating second sidelink signaling corresponding to the first sidelink signaling based at least in part on the first UE subscribing to the single frequency network-type relaying service at the second UE; and
  means for transmitting the second sidelink signaling via a resource configured for single frequency network-type transmission based at least in part on the generating and on the first UE subscribing to the single frequency network-type relaying service at the second UE.

30. A non-transitory computer-readable medium storing code for wireless communications at a second user equipment (UE), the code comprising instructions executable by a processor to:
  transmit, for a first UE, first signaling publishing a capability of the second UE to support a single frequency network-type relaying service;
  receive, for the first UE, second signaling indicating that the first UE is subscribing to the single frequency network-type relaying service at the second UE;
  receive first sidelink signaling corresponding to the first UE and a third UE;
  generate second sidelink signaling corresponding to the first sidelink signaling based at least in part on the first UE subscribing to the single frequency network-type relaying service at the second UE; and
  transmit the second sidelink signaling via a resource configured for single frequency network-type transmission based at least in part on the generating and on the first UE subscribing to the single frequency network-type relaying service at the second UE.

* * * * *